United States Patent
Ha et al.

(10) Patent No.: US 7,639,659 B2
(45) Date of Patent: Dec. 29, 2009

(54) APPARATUS AND METHOD FOR CONTROLLING HYBRID AUTOMATIC REPEAT REQUEST (HARQ) IN A MOBILE COMMUNICATION SYSTEM

(75) Inventors: Sang-Hyuck Ha, Suwon-si (KR);
Jin-Woo Heo, Seongnam-si (KR);
Min-Goo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 936 days.

(21) Appl. No.: 10/793,934

(22) Filed: Mar. 8, 2004

(65) Prior Publication Data

US 2004/0223473 A1 Nov. 11, 2004

(30) Foreign Application Priority Data

Mar. 8, 2003 (KR) .................. 10-2003-0014642

(51) Int. Cl.
H04B 7/216 (2006.01)
(52) U.S. Cl. .................. 370/342; 370/209; 370/216; 370/282; 370/320; 370/335; 370/338; 370/349; 455/450; 455/454; 455/522; 714/748; 714/749
(58) Field of Classification Search .............. 370/209, 370/216, 282, 320, 335, 338, 342, 349; 455/450, 455/454, 522; 714/748, 749
See application file for complete search history.

(56) References Cited

U.S. PATENT DOCUMENTS

| | | | |
|---|---|---|---|
| 6,631,127 B1 * | 10/2003 | Ahmed et al. | 370/349 |
| 6,731,623 B2 * | 5/2004 | Lee et al. | 370/349 |
| 6,735,180 B1 * | 5/2004 | Malkamaki et al. | 370/282 |
| 6,839,336 B2 * | 1/2005 | Tiedemann et al. | 370/335 |
| 6,934,275 B1 * | 8/2005 | Love et al. | 370/342 |
| 7,032,153 B1 * | 4/2006 | Zhang et al. | 714/749 |
| 7,065,377 B2 * | 6/2006 | Kwon et al. | 455/522 |
| 7,149,192 B2 * | 12/2006 | Kwak | 370/320 |
| 2002/0001296 A1 * | 1/2002 | Lee et al. | 370/338 |

(Continued)

Primary Examiner—Stephen M D'Agosta
(74) Attorney, Agent, or Firm—Roylance, Abrams, Berdo & Goodman, L.L.P.

(57) ABSTRACT

A Hybrid Automatic Repeat reQuest (HARQ) control apparatus and method for detecting a message received over a packet data control channel in a mobile communication system are provided in which a base station transmits a packet data control message over at least one packet data control channel and transmits packet data to a mobile station over a packet data channel. A control channel decoder decodes a control message received over the packet data control channel. Based on the decoded control message, the HARQ controller determines at least one of whether to perform demodulation and decoding on a packet received over the packet data channel, whether to update a Walsh mask, and whether to perform state transition on the mobile station. The HARQ controller based on the determination performs at least one of the following functions: outputs demodulation and decoding parameters, updates a Walsh mask, and outputs a state transition value to an upper layer. A data channel demodulator demodulates packet data received over the packet data channel upon receiving a demodulation parameter from the HARQ controller. A decoder decodes the packet data demodulated by the data channel demodulator upon receiving a decoding parameter from the HARQ controller.

10 Claims, 13 Drawing Sheets

U.S. PATENT DOCUMENTS

| | | | |
|---|---|---|---|
| 2002/0009999 A1* | 1/2002 | Lee et al. | 455/454 |
| 2002/0013102 A1* | 1/2002 | Kayworth et al. | 439/638 |
| 2002/0150040 A1* | 10/2002 | Tong et al. | 370/216 |
| 2003/0039204 A1* | 2/2003 | Tiedemann, Jr. | 370/209 |
| 2003/0174669 A1* | 9/2003 | Roh et al. | 370/328 |
| 2003/0203736 A1* | 10/2003 | Chi et al. | 455/450 |

* cited by examiner

APPARATUS AND METHOD FOR CONTROLLING HYBRID AUTOMATIC REPEAT REQUEST (HARQ) IN A MOBILE COMMUNICATION SYSTEM

PRIORITY

This application claims priority under 35 U.S.C. § 119 to an application entitled "Apparatus and Method for Controlling HARQ in a Mobile Communication System" filed in the Korean Intellectual Property Office on Mar. 8, 2003 and assigned Serial No. 2003-14642, the contents of which are incorporated herein by reference.

BACKGROUND OF THE INVENTION

1. Field of the Invention

The present invention relates generally to an apparatus and method for controlling Automatic Repeat reQuest (ARQ) in a high-speed data transmission system, and in particular, to an apparatus and method for controlling Hybrid Automatic Repeat reQuest (HARQ) in a high-speed data transmission system.

2. Description of the Related Art

Mobile communication systems have been developed to provide a high-quality call service to mobile users. With the development of mobile communication systems, research is being conducted on a method for transmitting increasing amounts of data to users. In addition, mobile communication systems have evolved from an analog system to a digital system. Using the digital system, the mobile communication systems can now transmit increased amounts of data to users at higher speeds.

Generally, in digital mobile communication systems where a variation in channel condition is significant and different types of service traffic channels coexist with each other, a Hybrid Automatic Repeat reQuest (hereinafter referred to as "HARQ") scheme is used to meet demand for high-speed data transmission, i.e., to increase transmission efficiency or transmission throughput. Particularly, as the commercialization of high-speed data transmission service has been realized, analysis and research are being actively conducted on technology for efficiently applying a HARQ scheme using error correction codes with a variable code rate, rather than a HARQ scheme using existing error correction codes with a fixed code rate. For a channel structure for high-speed transmission, a method of using high-level modulation such as 8-ary phase shift keying (8-PSK) and 16-ary quadrature amplitude modulation (16-QAM) in addition to the general binary phase shift keying (BPSK) or quadrature phase shift keying (QPSK), as a modulation scheme, is also taken into consideration.

Currently, a Code Division Multiple Access 2000 for Spreading Rate 1 (CDMA2000 1×) Evolution Data and Voice (EV-DV) system, which is a new transmission standard for a synchronous Third Generation Partnership Project (3GPP2) CDMA system, has adopted a coding scheme using quasi-complementary turbo codes (QCTC) as its standard. The quasi-complementary turbo codes provide a variable code rate to a coding scheme for a HARQ scheme over high-speed data and guarantee an improvement in soft combining performance based on HARQ. In the EV-DV system, packet data transmission/reception is performed by a HARQ or fast HARQ operation at a physical layer. This will be described in detail with reference to FIGS. 1 and 2.

FIG. 1 is a block diagram illustrating a relationship between an upper layer and a physical layer for ARQ processing according to the prior art. Referring to FIG. 1, a physical layer 110 decodes data received over a radio channel and makes decoded frame data. The physical layer 110 provides the decoded frame data to a medium access control (MAC) layer 120 called an upper layer. The MAC layer 120 determines whether the decoded frame data received from the physical layer 110 has a Protocol Data Unit (MuxPDU) error. When an error occurs, the MAC layer 120 retransmits the defective data. However, when no error occurs, the MAC layer 120 transmits a new frame. When such processing is performed in the MAC layer 120, since data decoded in the physical layer must be delivered to the upper layer to be processed, ARQ processing speed is undesirably decreased. In addition, since high-speed data processing must be performed, the load on the MAC layer 120 is increased. Hence, a structure in which part of an ARQ operation is performed in the physical layer as illustrated in FIG. 2 has been proposed.

FIG. 2 is a block diagram illustrating a relationship between an upper layer and a physical layer for improved fast (physical) HARQ processing. With reference to FIG. 2, a description will now be made of the relationship between an upper layer and a physical layer for improved fast HARQ processing.

In FIG. 2, part of an ARQ operation that has been performed in a MAC layer 230 is performed in a physical layer or its intermediate layer for fast ARQ response and processing. That is, in this scheme, a physical layer 200 has a basic physical layer 210 and a HARQ controller 220 performs the same operation as that of FIG. 1. The HARQ controller 220 performs part of the operation that has been performed in the conventional MAC layer. Therefore, the HARQ controller 220 is included in the physical layer in structure, but performs part of an operation of the MAC layer 230. Because of such characteristics, the HARQ controller 220 is often classified as a MAC layer. However, since the physical layer determines data retransmission, a processing time for the same data is shortened.

In addition, NAK transmission from the upper layer can disable soft combining on the same data, because the physical layer can maintain a soft-combined value for each symbol. However, since data symbols delivered from the physical layer to the MAC layer are all expressed with a binary value (0 or 1), although a symbol is repeated by retransmission, there is no way to soft combine the repeated symbol. The only method is to use a majority voting method for calculating the number of 0s and 1s for symbols having a binary value, and comparing the number of 0s with the number of 1s to determine a majority symbol. However, this method also cannot be used in the upper layer because of its required calculations.

In contrast, NAK transmission from the physical layer enables soft combining on code symbols for the same encoder packet, contributing to efficient utilization of channel resources. Therefore, it is preferable to dispose of the HARQ controller 220 under a multiplexing sublayer 230 of the MAC layer. That is, it is preferable for the MAC layer to perform an operation of the physical layer.

This structure has a fast processing time compared with a conventional ARQ control method operating based on a Radio Link Protocol (RLP). This method will now be compared with the existing method. In the conventional method of FIG. 1, a NAK signal is received through one packet transmission, and a round trip delay of a minimum of about 200 msec occurs up to a time when a retransmission packet is transmitted due to the NAK signal. On the contrary, in the method of FIG. 2, HARQ generates a very short round trip delay of a minimum of about several milliseconds. Therefore, it has a very good structure for implementing adaptive modulation and coding (AMC).

In order to actually operate HARQ with the structure of the upper layer and the physical layer of FIGS. 1 and 2, a HARQ transmission protocol of a transmitter for a retransmission request (i.e., NAK transmitted from a receiver) is required. For this, the 3GPP2 CDMA2000 1×EV-DV system uses Asynchronous and Adaptive Increment Redundancy (AAIR) for packet data transmission, and this will be described in brief below.

A base station asynchronously performs packet transmission to a corresponding mobile station according to the quality of a forward channel transmitted from the mobile station. At this point, a modulation scheme and a code rate of the transmission packet are adaptively applied according to a channel condition. In addition, a packet that failed to be transmitted during initial transmission is retransmitted. During retransmission, a code symbol pattern that is different from that used for the initial transmission can be transmitted. Such an AAIR HARQ scheme increases a signal-to-noise ratio (SNR) of packet data due to an increase in the number of retransmissions, and increases a coding gain due to a decrease in a code rate, thereby improving packet data transmission/reception performance.

A channel used for transmission of forward packet data in the 1×EV-DV system includes a forward packet data channel (F-PDCH) for payload traffic and a forward packet data control channel (F-PDCCH) for controlling the F-PDCH. F-PDCH is a channel for transmitting an encoder packet (EP) which is a transmission data block, and a maximum of up to 2 channels are used to simultaneously transmit their encoder packets to 2 mobile stations by using time division multiplexing (TDM)/code division multiplexing (CDM). An encoder packet is encoded by a turbo encoder, and then some of the encoded symbols are selected as a subpacket having a specific Increment. Redundancy (IR) pattern by OCTC symbol selection. The subpacket is a transmission unit for initial transmission and retransmission, and at each transmission, an IR pattern of a subpacket is identified by a subpacket identifier (SPID). A modulation scheme (QPSK, 8PSK or 16QAM) and a transmission slot length (1, 2 or 4 slots) of the subpacket are determined according to forward channel quality information transmitted from a mobile station and resources (e.g., the number of Walsh codes and power assignable to F-PDCH) of a base station.

Information related to demodulation and decoding of F-PDCH is multiplexed with F-PDCH through other orthogonal channels for the same slot period, and then transmitted over the F-PDCCH which is a control channel. Information included in the F-PDCCH is very important in performing a physical layer HARQ operation by a mobile station, and requires the following:

1) fragmented Walsh code information available for F-PDCH every several tens to several hundreds of milliseconds;

2) MAC_ID: MAC_ID of a mobile station (MS) to which F-PDCH is assigned;

3) ACID: ID for identifying 4 ARQ channels (ARQ channel ID);

4) SPID: ID for identifying an IR pattern of a subpacket;

5) EP_NEW: information for distinguishing two consecutive encoder packets in the same ARQ channel;

6) EP_SIZE: a bit size of an encoder packet; and

7) Last Walsh Code Index (LWCI): information on a Walsh code used for F-PDCH.

Meanwhile, packet data reception in a mobile station is performed from the decoding of F-PDCCH. A mobile station first decodes F-PDCCH to determine whether its own packet is being transmitted, and if it is determined that the transmitted packet is its own packet, the mobile station performs demodulation and decoding on F-PDCH. If a currently received subpacket is a subpacket that was retransmitted for a previously received encoder packet, the mobile station performs decoding after code-combining the currently received subpacket with code symbols of an encoder packet that was previously received and stored therein. If the decoding is successful, the mobile station transmits an ACK signal over a reverse ACK/NAK transmission channel (R-ACKCH), allowing the base station to transmit a subpacket for the next encoder packet. If the decoding is not successful, the mobile station transmits a NAK signal, requesting the base station to transmit a subpacket for the same encoder packet.

A unit for which a physical layer's HARQ operation is performed on one encoder packet is called an "ARQ channel." In the CDMA2000 1×EV-DV system, a maximum of 4 ARQ channels can simultaneously operate, and these are called "N=4 fast HARQ channels."

In the 1×EV-DV standard, it is provided that ACK/NAK Delay which is required to be performed by a mobile station a packet reception operation and transmitting ACK/NAK and the number of simultaneously available ARQ 10 channels should be provided to a base station by the mobile station, and this becomes an implementation issue for a mobile station. Therefore, a possible ACK/NAK Delay supported by the mobile station is 1 slot (=1.25 msec) or 2 slots (2.5 msec), and the possible number of ARQ channels is 2, 3 or 4. With reference to FIGS. 3 and 4, a description will now be made of an operation depending on ACK/NAK Delay and the number of ARQ channels.

FIG. 3 is a timing diagram illustrating an example of a timing relationship between a base station and a mobile station for ACK/NAK Delay=1 slot during a HARQ operation in a mobile communication system, and FIG. 4 is a timing diagram illustrating an example of a timing relationship between a base station and a mobile station for ACK/NAK Delay=2 slots during a HARQ operation in a mobile communication system.

It will be assumed in FIGS. 3 and 4 that a F-PDCH is assigned to a mobile station A. In addition, for the convenience of explanation, indexes are sequentially assigned to time slots of both a base station (BS) and a mobile station (MS) from a $0^{th}$ time slot beginning at a particular time. Further, in FIGS. 3 and 4, A(x,y) has the following meaning. Hatched parts denote data to be transmitted to the mobile station A. In addition, 'x' denotes an ARQ channel, and 'y' denotes an index for distinguishing an IR pattern for the same encoder packet.

Based on this, a description will now be made of FIG. 3 in which ACK/NAK Delay is 1 slot.

Referring to FIG. 3, data from a base station is transmitted to a mobile station A at a $0^{th}$ slot. Then, the mobile station A receives the packet data at the same slot. In FIGS. 3 and 4, the base station and the mobile station have different slot start points due to transmission delay occurring between the mobile station and the base station on the basis of an absolute time. At this point, the base station transmits packet data and a packet data control signal over a F-PDCH and a F-PDCCH, respectively. Then, the mobile station A determines whether the data has an error, for a one-slot processing time, and thereafter, transmits ACK or NAK to the base station. The "processing time" refers to a time required for performing demodulation and decoding on received packet data for one slot, and transmitting the result at the next slot over a reverse channel (R-ACKCH). For example, in FIG. 3, NAK is transmitted. The base station then receives the NAK at a $3^{rd}$ slot, and schedules retransmission of the defective data at a $4^{th}$ slot.

Thereafter, the base station transmits data of a different pattern for the same encoder packet according to the scheduling result.

Next, a description will be made of FIG. 4 in which ACK/NAK Delay is 2 slots. It will be assumed in FIG. 4 that an error has occurred in a first data packet among the data packets transmitted from a base station to a mobile station A, and the description focus on the first data packet. Since the delay time is 2 slots, the base station continuously transmits packet data to the mobile station A at a $0^{th}$ slot, a $1^{st}$ slot and a $2^{nd}$ slot. The mobile station then checks an error of the data transmitted at the $0^{th}$ slot for a period between the $1^{st}$ slot and $2^{nd}$ slot, checks an error of the data transmitted at the $1^{st}$ slot for a period between the $2^{nd}$ slot and $3^{rd}$ slot, and checks an error of the data transmitted at the $2^{nd}$ slot for a period between the $3^{rd}$ slot and $4^{th}$ slot. ACK/NAK for the data received at the $0^{th}$ slot is transmitted at the $3^{rd}$ slot, ACK/NAK for the data received at the $1^{st}$ slot is transmitted at the $4^{th}$ slot, and ACK/NAK for the data received at the $2^{nd}$ slot is transmitted at a $5^{th}$ slot. If the base station receives, at the $4^{th}$ slot, NAK for the packet data transmitted at the $0^{th}$ slot, the base station performs, at the next slot, retransmission on an encoder packet transmitted at the $0^{th}$ slot. The retransmitted packet data is the same packet as the previously transmitted packet but has a different IR pattern.

As can be understood from FIGS. 3 and 4, the mobile station performs synchronous ACK/NAK transmission in which the mobile station must transmit ACK or NAK for a received packet after a lapse of 1 slot or 2 slots. The base station performs asynchronous ACK/NAK transmission in which the base station can transmit a packet at any slot after receiving ACK/NAK for a packet previously transmitted by the mobile station for the same ARQ channel.

In addition, FIGS. 3 and 4 illustrate a 1-channel ARQ operation and a 4-channel ARQ operation, respectively. In the 1-channel ARQ operation of FIG. 3, data transmission to one mobile station uses only a part of base station resources, decreasing a packet data rate of a corresponding mobile station. In contrast, in the 4-channel ARQ operation of FIG. 4, one mobile station can use the entire resources of the base station, so a corresponding mobile station can obtain a maximum packet data rate.

As described above, it is possible to enable fast ARQ response and processing by moving ARQ control that was achieved in the conventional upper layer, under a multiplexing layer. However, this is a mere logical resolution in the standard, and the following problems arise in its actual implementation.

First, currently, most systems implement an upper layer including a multiplexing layer by software loaded in a central processing unit (CPU). However, in the case of a mobile station, its CPU does not have high processing speed and capability. Therefore, in implementing a HARQ protocol requiring a fast response in the CPU, overload may occur in a clock of the CPU. As a result, the mobile station may fail to perform its normal operation. Particularly, such a problem serves as a big hindrance to implementation, when power consumption of the mobile station is an implementation limitation factor of the system.

Second, transmission interrupt of coded data and a processing delay due to the interrupt, which impose an overload to the CPU, must be reduced to process high-speed transmission data. Therefore, consideration should be taken of a method for reducing data processing interrupts which may occur every 1.25 msec.

Third, in order to support N-channel HARQ, N independent HARQ controllers are required. Therefore, if N is increased, the number of HARQ controllers is also increased, resulting in increased power consumption and complexity. Thus, in implementation, the number of HARQ controllers must be minimized.

Fourth, in order to support N-channel HARQ, N independent turbo decoders are required. Therefore, if N is increased, the number of turbo decoders is also increased, resulting in increased in power consumption and complexity. Thus, in implementation, the number of turbo decoders must be minimized.

Fifth, in the standard, ACK_DELAY=1 slot and ACK_DELAY=2 slots described in conjunction with FIGS. 3 and 4 are exclusive options. However, in implementing a mobile station, a structure for varying an operating clock of the mobile station by selectively demultiplying/multiplying the operating clock for low power consumption is considered, so a mobile station's structure capable of applying both ACK_DELAYs in one mobile station must be designed.

Sixth, unlike the conventional data traffic, an encoder packet which is a data block transmitted over a forward packet data channel (F-PDCH) can change its transmission scheme every 1.25 msec. Therefore, a new structure for transmitting, every 1.25 msec, channel structure information that is transmitted once during setup of a data channel is required.

Finally, the other control information necessary for application of a mobile station is transmitted by a base station over a forward packet data control channel (F-PDCCH) which is a traffic control channel. Therefore, the mobile station must efficiently perform an operation of detecting the control information and delivering the detected control information to the upper layer within a short time.

SUMMARY OF THE INVENTION

It is, therefore, an object of the present invention to provide an apparatus and method for resolving the problems of the conventional technology.

It is another object of the present invention to provide an apparatus and method for reducing a load of a Central Processing Unit (CPU).

It is further another object of the present invention to provide an apparatus and method for reducing power consumption of a mobile station in a Hybrid Automatic Repeat reQuest (HARQ) control apparatus.

It is yet another object of the present invention to provide an apparatus and method for reducing a load of a CPU caused by a maximum driving clock in a HARQ control apparatus.

It is still another object of the present invention to provide an apparatus and method for reducing a data processing time in a HARQ control apparatus.

It is still another object of the present invention to provide a simple control apparatus and method which is not dependent on the number of channels in a HARQ control apparatus supporting N-channel HARQ.

It is still another object of the present invention to provide a control apparatus and method for preventing complexity from being increased according to the number of channels in a HARQ control apparatus.

It is still another object of the present invention to provide an apparatus and method for processing all received packets regardless of the number of channels, using a small number of turbo decoders.

It is still another object of the present invention to provide an apparatus and method capable of supporting both an ACK_DELAY=1 slot mode and an ACK_DELAY=2 slot mode.

It is still another object of the present invention to provide an apparatus and method for controlling calculation and setting of control channel parameters generated every slot after initial setup of a packet data channel (PDCH).

It is still another object of the present invention to provide an apparatus and method for calculating and modifying parameters for demodulation and decoding of a traffic channel in a mobile communication system.

It is still another object of the present invention to provide an apparatus and method for rapidly delivering control information of a traffic control channel to an upper layer.

To substantially achieve the above and other objects, there is provided a Hybrid Automatic Repeat reQuest (HARQ) control apparatus for detecting a message received over a packet data control channel in a mobile communication system in which a base station transmits a packet data control message over at least one packet data control channel and transmits packet data to a mobile station over a packet data channel. In the apparatus, a control channel decoder decodes a control message received over the packet data control channel. A HARQ controller receives the decoded control message from the control channel decoder, determines based on the decoded control message whether to perform at least one of demodulation and decoding on a packet received over the packet data channel, update a Walsh mask, and state transition on the mobile station, based on the HARQ controller performing at least one of the following operations: outputs demodulation and decoding parameters, updates a Walsh mask, and outputs a state transition value to an upper layer. A data channel demodulator demodulates packet data received over the packet data channel upon receiving a demodulation parameter from the HARQ controller. A decoder decodes the packet data demodulated by the data channel demodulator upon receiving a decoding parameter from the HARQ controller.

To substantially achieve the above and other objects, there is provided a method for detecting a message received over a packet data control channel in a physical layer included in a mobile station of a mobile communication system in which a base station transmits a packet data control message over at least one packet data control channel and transmits packet data to the mobile station over a packet data channel. The method comprises the steps of decoding a control message received over the packet data control channel; determining whether the decoded control message is transmitted to the mobile station, and determining whether the decoded control message is for demodulation and decoding of a packet data channel if the decoded control message is transmitted to the mobile station; if the decoded control message is for demodulation and decoding of the packet data channel, calculating demodulation and decoding parameters for the packet data; determining a state of the physical layer using the decoded control message; and performing demodulation and decoding on the packet data channel according to the decoded control message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
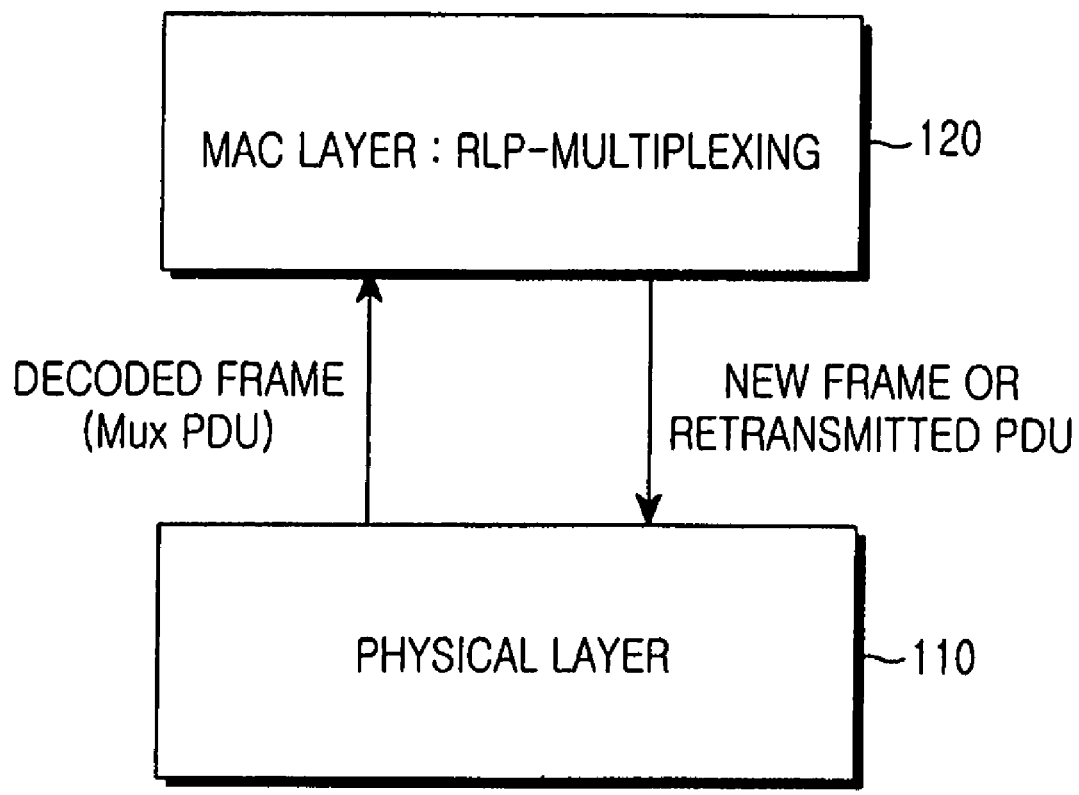
FIG. 1 is a block diagram illustrating a relationship between an upper layer and a physical layer for Automatic Repeat reQuest (ARQ) processing according to the prior art.
Figure 2:
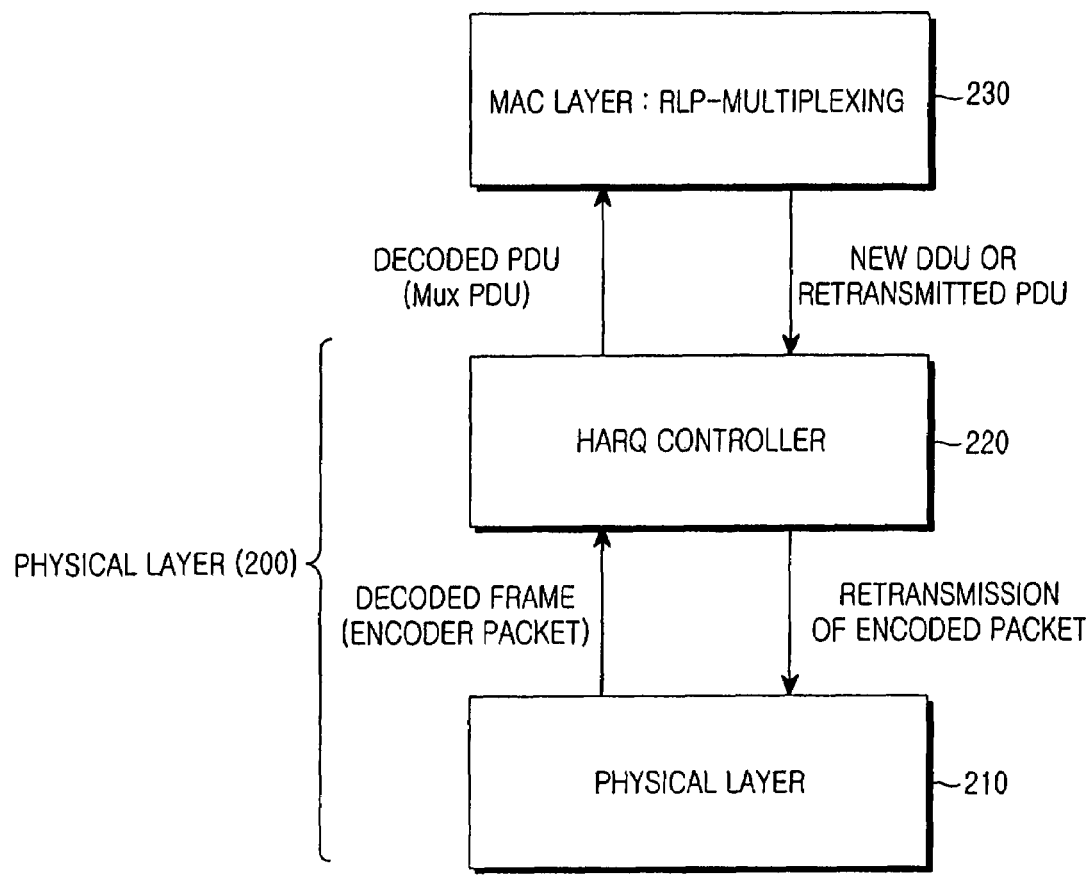
FIG. 2 is a block diagram illustrating a relationship between an upper layer and a physical layer for improved fast (physical) Hybrid Automatic Repeat reQuest (HARQ) processing.
Figure 3:
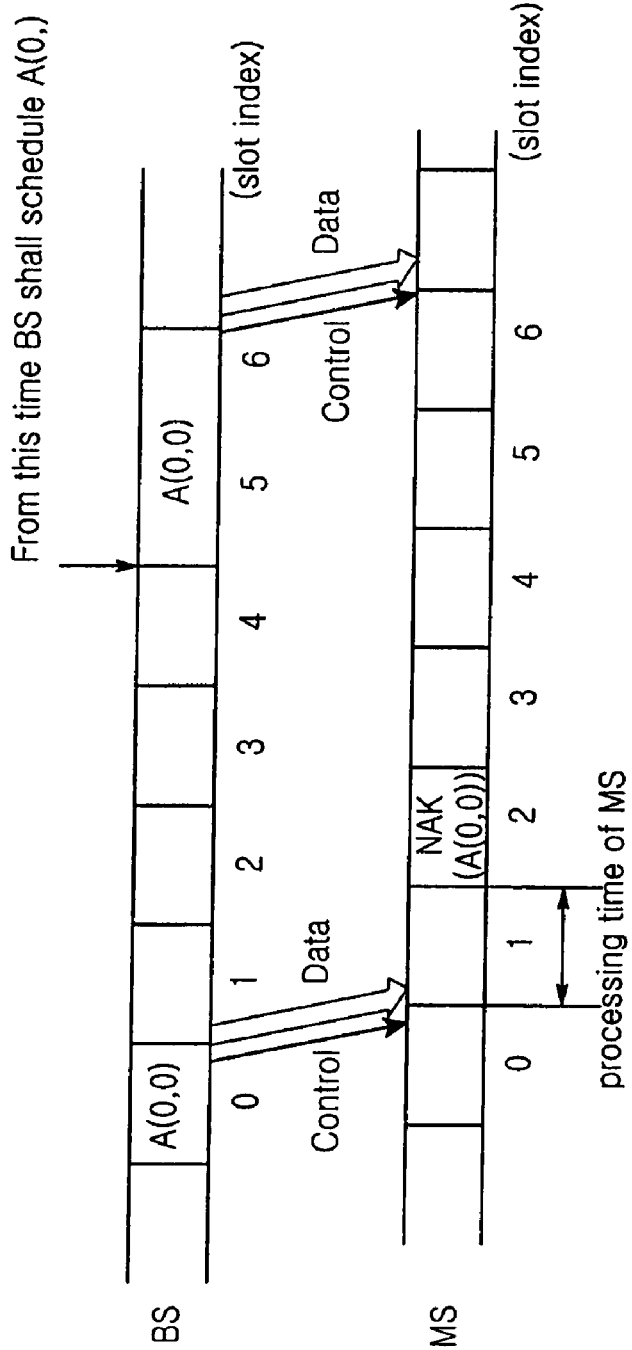
FIG. 3 is a timing diagram illustrating a relationship between a base station and a mobile station for ACK/NAK Delay=1 slot during a HARQ operation in a mobile communication system.
Figure 4:
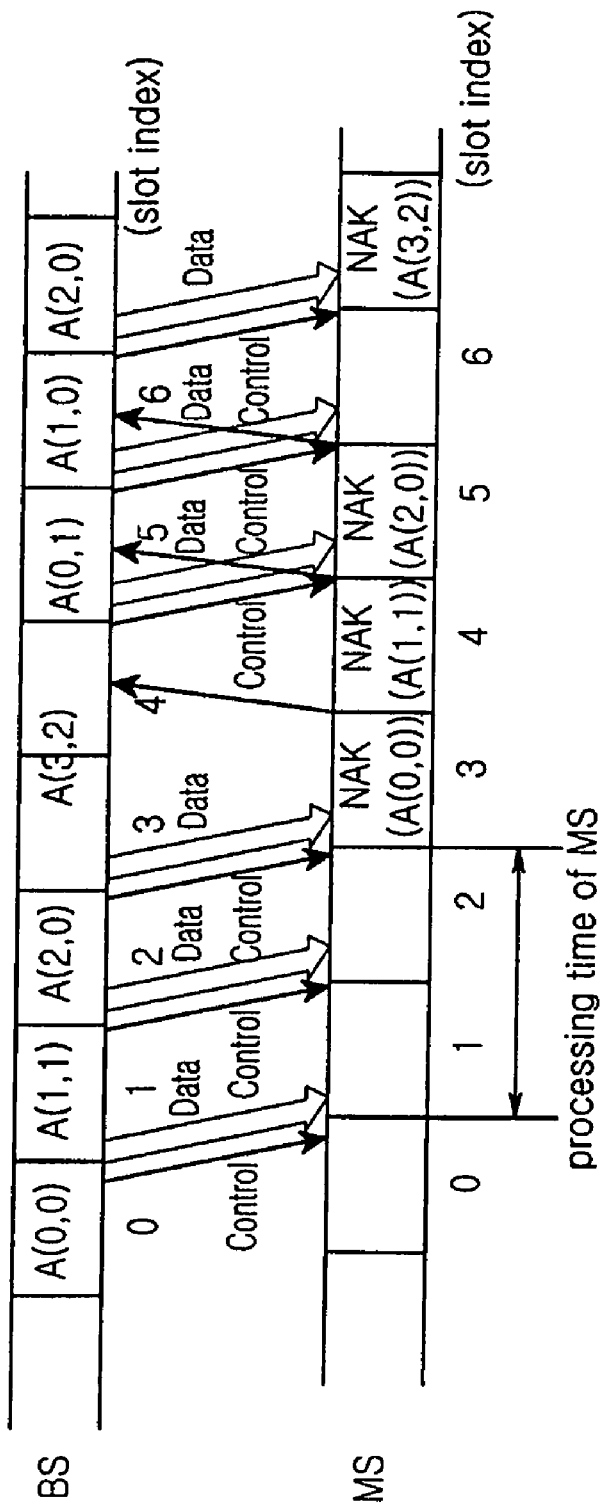
FIG. 4 is a timing diagram illustrating a relationship between a base station and a mobile station for ACK/NAK Delay=2 slots during a HARQ operation in a mobile communication system.

An embodiment of the present invention will now be described in detail with reference to the accompanying drawings. In the drawings, the same or similar elements are denoted by the same reference numerals. In the following description, a detailed description of known functions and configurations incorporated herein has been omitted for conciseness.

An apparatus and method of the present invention for resolving the foregoing problems will now be described.

Function of HARQ Controller

Upon receiving Evolution Data and Voice (EV-DV) (forward link RC-10) packet data, a Hybrid Automatic Repeat reQuest (HARQ) controller controls an operation on each block related to the received packet data. Each block related to reception of the packet data operates under the control of the HARQ controller, and after completion of a corresponding operation, informs the HARQ controller of the completion of the corresponding operation. The HARQ controller performs the next operation using the operation completion information from each block. In addition, the HARQ controller stores input information and internal information from each block in its register. By doing so, the HARQ controller can monitor the progress of a HARQ operation. The control of each block, performed by the HARQ controller, is mainly timing control for performing the HARQ operation within a given time, and does not include control for a unique operation of each block. In addition, the HARQ controller determines whether it will perform a normal mode operation or an abnormal mode operation using reception information and internal information on a forward packet data control channel (F-PDCCH). The HARQ controller performs an operation based on the determination. The operation in the abnormal mode is caused by an error in a radio channel state, and is for reducing misoperation of a mobile station and improving data reception performance.

Typical functions of the HARQ controller according to the embodiment of the present invention are as follows:

(1) The HARQ controller determines whether it will perform a normal mode operation or an abnormal mode operation according to a reception message on F-PDCCH and internal information of the HARQ controller.

(2) The HARQ controller controls demodulation and turbo decoding operations for F-PDCH according to an operation mode.

(3) The HARQ controller determines information (ACK/NAK or Silence) to be transmitted over a reverse acknowledgement channel (R-ACKCH).

(4) The HARQ controller generates an interrupt to an upper layer in order to transfer received data to an output buffer of a turbo decoder.

(5) The HARQ controller continuously stores and updates related information for each Automatic Repeat reQuest (ARQ) channel.

(6) The HARQ controller supports a maximum of 4 ARQ channels.

(7) The HARQ controller supports a control operation for both ACK/NAK Delay=1 slot and ACK/NAK Delay=2 slots.

Figure 5:
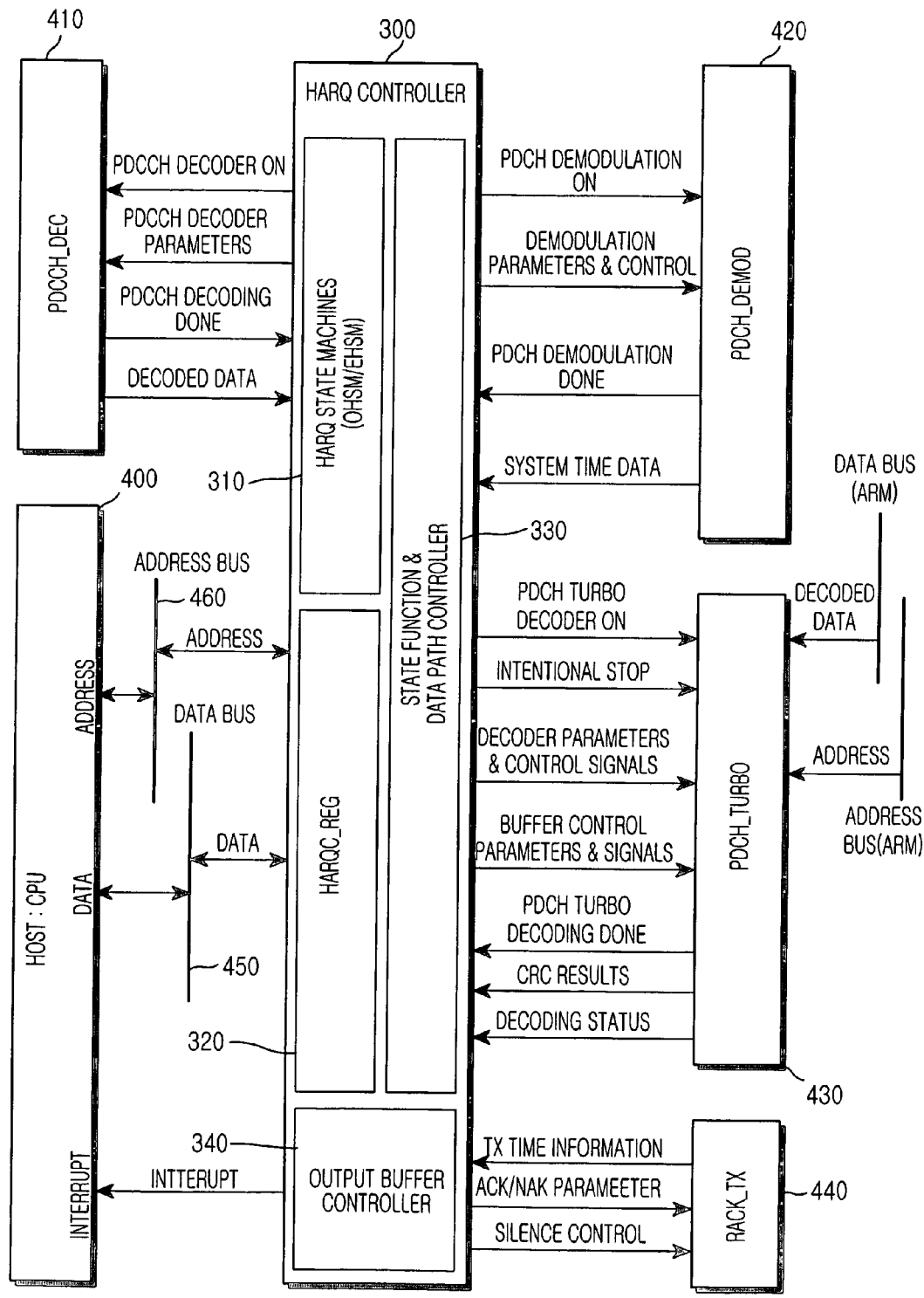
FIG. 5 is a block diagram illustrating an interface between peripheral blocks centering on a HARQ controller according to an embodiment of the present invention.

FIG. 5 is a block diagram illustrating an interface between peripheral blocks centering on the HARQ controller according to an embodiment of the present invention. With reference to FIG. 5, a description will now be made of respective blocks connected to the HARQ controller according to the embodiment of the present invention, and an internal structure and operation of the HARQ controller.

The HARQ controller 300 includes therein 2 HARQ state machines (OHSM/EHSM) 310, a HARQ register (HARQC_REG) 320, a state function and data path controller 330, and an output buffer controller 340. A HARQ operation is controlled by the HARQ state machines 310 and the state function and data path controller 330 among the elements of the HARQ controller 300. An output buffer connected to a data channel turbo decoder 430, which will be described later, is controlled by the output buffer controller 340. Connections of signals input to and output from the HARQ controller 300 are schematically illustrated in FIG. 5. That is, signals output from a particular internal block are not illustrated. Now, with reference to the accompanying drawings, a description will be made of respective internal structures and their connections of the HARQ controller 300 illustrated in FIG. 5.

The HARQ controller 300 is connected to a processor (CPU or host) 400, and can exchange data via a data bus 450 and an address bus 460. Further, the HARQ controller 300 can transmit an interrupt signal to the processor 400 via an interrupt line. The HARQ controller 300 is connected to a control channel decoder (PDCCH_DEC) 410 for decoding data carried on a packet data control channel, controls an On/Off operation of the control channel decoder 410, and provides a decoding parameter for the data carried on the packet data control channel. The control channel decoder 410 for decoding data on the packet data control channel (PDCCH) decodes data on the packet data control channel based on the parameter received from the HARQ controller 300, and then delivers the decoded data to the HARQ controller 300 along with a decoding-done signal.

The HARQ controller 300 is also connected to a data channel demodulator (PDCH_DEMOD) 420 for demodulating data carried on a packet data channel, controls an On/Off operation of the data channel demodulator 420, and provides demodulation parameters and control signals to the data channel demodulator 420. In response, the data channel demodulator 420 demodulates data carried on the packet data channel, delivers the demodulated data to the HARQ controller 300, and provides system time data to the HARQ controller 300.

The embodiment of the present invention provides a controller operating in the EV-DV system. Therefore, data transmitted from the EV-DV system is fundamentally turbo-encoded by a turbo encoder before being transmitted. Therefore, the HARQ controller 300 is connected to a data channel turbo decoder (PDCH_TURBO) 430 for decoding data carried on a packet data channel, and performs an On/Off operation of the data channel turbo decoder 430. In addition, the HARQ controller 300 provides the data channel turbo decoder 430 with an intentional stop signal, turbo decoding parameters and control signals, and buffer control parameters and control signals. The data channel turbo decoder 430 then turbo-decodes data on a packet data channel based on various parameters and control signals received from the HARQ controller 300, and provides the HARQ controller 300 with a turbo decoding-done signal, a CRC result signal, and a decoding status signal. In addition, the data channel turbo decoder 430 is connected to a data bus and an address bus in order to store and read data into/from a memory (not shown). The HARQ controller 300 performs a control operation of delivering data stored in a buffer connected to the turbo decoder 430 to the processor 400.

The HARQ controller 300 is also connected to an acknowledgement signal transmitter (RACK_TX) 440, and performs ACK/NAK and Silence control on the data on a received packet data channel according to its decoding result. In response, the acknowledgement signal transmitter 440 then outputs an ACK/NAK signal, or maintains the Silence state. In addition, the acknowledgement signal transmitter 440 outputs transmission timing information to the HARQ controller 300.

Operations and states of the HARQ controller 300 will be described with reference to Table 1 below.

TABLE 1

| State | Description | ACK_DELAY (slot) |
|---|---|---|
| S1 | WAITING_FOR_PDCCH_DEC_DONE<br>A state where the HARQ controller waits for PDCCH_DEC_DONE to be received from PDCCH_DEC. | 1 & 2 |
| S2 | DEMOD_SIG_GEN<br>A state where the HARQ controller calculates parameters for New/Continue Decision of subpacket, Extraction of Signaling message, and PDCH Demodulation. | 1 & 2 |
| S3 | PDCH_DEMOD<br>A state where the HARQ controller performs PDCH Demodulation. | 1 & 2 |

TABLE 1-continued

| State | Description | ACK_DELAY (slot) |
|---|---|---|
| S4 | WAITING_FOR_TURBO_DECODER_TO_USE<br>A state where the HARQ controller waits for TURBO decoder to use. | 2 |
| S5 | TURBO_DECODING<br>A state where the HARQ controller delivers decoding start signal and necessary parameters to PDCH Turbo decoder and waits for decoding to be done. | 1 & 2 |
| S6 | ACK_NAK_TRANSMISSION<br>A state where the HARQ controller transmits ACK/NAK over Reverse channel after PDCH Turbo decoding is done. | 1 & 2 |

In Table 1, respective states S1, S2, S3, S4, S5 and S6 represent states defined in order of an operation requested at a particular time in the HARQ controller 300 and a next operation performed thereafter. The respective states S1, S2, S3, S4, S5 and S6 have a mutual relationship between a previous operation and a next operation. In addition, Table 1 illustrates states necessary for ACK/NAK Delay=1 slot, and states necessary for ACK/NAK Delay=2 slots. For example, the fourth state S4 represents a state necessary only for ACK/NAK Delay=2 slots. The respective states of Table 1 will now be described herein below.

The first state S1 is an 'initial state' that is performed when a packet data control channel message being matched to MACID in control data carried on a packet data control channel (PDCCH) is received or reception of a predetermined control message to be transmitted from a base station to a mobile station is detected. When the HARQ controller 300 enters the first state S1, it waits for decoding of control data carried on a packet data control channel to be completed. That is, the data channel demodulator 420 can demodulate data on a packet data channel using control data on a packet data control channel. In addition, the HARQ controller 300 performs a register initialization operation in the first state S1, and then transitions to the second state S2 when decoding of the packet data control channel is completed.

In the second state S2, the HARQ controller 300 calculates parameters for demodulation of a packet data channel using various messages received as the decoding result in the first state S1. The second state S2 becomes a 'HARQ control state'. Further, in the second state S2, the HARQ controller 300 processes a HARQ protocol in the physical layer. That is, in the second state S2, the HARQ controller 300 calculates a modulation level necessary for demodulation and to determine the number of Walsh code channels, and delivers the results to the data channel demodulator 420. In addition, the HARQ controller 300 determines in the second state S2 whether a subpacket received in the first state S1 over a packet data channel according to ACID and EP_NEW which are decoding results of a packet data control channel is new data (initial transmission data) or retransmitted data. Further, when an upper layer control message (or signaling message) is detected according to the decoding result of the packet data control channel, the HARQ controller 300 directly determines ACK/NAK transmission, disregarding another process. Besides, the HARQ controller 300 performs an invalidity test in the second state S2, and if it is determined that the base station transmits a cannot transmit message, the HARQ controller 300 returns to the first state S1 which is an initial state.

In the third state S3, the HARQ controller 300 controls the data channel demodulator 420 to demodulate data carried on a packet data control channel. The third state S3 is a 'demodulation state'. In this demodulation state, a parameter for demodulation of the detection result on initial transmission data or retransmission data detected in the second state S2 is provided to the data channel demodulator 420 to demodulate a subpacket carried on a packet data channel. Therefore, in the third state S3, the HARQ controller 300 provides parameters necessary for demodulation to the data channel demodulator 420, and then waits until demodulation is completed. If the demodulation is completed, the HARQ controller 300 transitions to the fourth state S4 or the fifth state S5 according to the number of slots constituting ACK/NAK Delay.

In a specific case, the HARQ controller 300 transitions to the fourth state S4. The fourth state S4 is a 'waiting state' where the HARQ controller 300 waits while a subpacket received over a previous packet data channel is demodulated by HARQ state machines 310 included in the HARQ controller 300. Such a control state needs to be held only for ACK/NAK Delay=2 slots because the data channel turbo decoder 430 must decode new data every slot for ACK/NAK Delay=1 slot. However, for ACK/NAK Delay=2 slots, the data channel turbo decoder 430 may be in the process of decoding data received at a previous slot. In that case, the HARQ controller 300 must wait until an operation of the data channel turbo decoder 430 is completed. Furthermore, since only one data channel turbo decoder 430 is used in embodiment of the present invention, this state is necessarily required for the ACK/NAK Delay=2 slots in order to prevent data collision. That is, by employing the fourth state S4, it is possible to process a plurality of packet data channels using one turbo decoder even when ACK/NAK Delay has 2 or more slots. The HARQ controller 300 transitions to the fifth state S5, if the data channel turbo decoder 430 becomes available while the HARQ controller 300 is waiting in the fourth state S4.

In the fifth state S5, the HARQ controller 300 controls turbo decoding. The fifth state S5 becomes a 'decoding state'. That is, in the fifth state S5, the HARQ controller 300 provides various information necessary for turbo decoding to the data channel turbo decoder 430. The information necessary for turbo decoding can be a size of an encoder packet (EP) and ACID. The HARQ controller 300 provides the above information to the data channel turbo decoder 430 and thereafter, waits until a decoding operation is completed. However, in some cases, turbo decoding is performed for an excessively long time, or turbo decoding must be performed early by other information. In this case, the HARQ controller 300 can compulsorily stop turbo decoding by outputting an intentional stop signal. The HARQ controller 300 transitions to the sixth state S6, when the turbo decoding is completed or intentionally ended.

In the sixth state S6, the HARQ controller 300 transmits an ACK/NAK signal for a subpacket received over a reverse channel according to the decoding result of the data channel turbo decoder 430. That is, the sixth state S6 is an 'ACK/NAK transmission state'. Therefore, the HARQ controller 300 controls the acknowledgement signal transmitter 440, and as a result of the decoding, if there is no error, the HARQ controller 300 transmits ACK over a reverse channel. In contrast, if an error has occurred, the HARQ controller 300 transmits NAK over a reverse channel. Since the sixth state S6 is the final state of the HARQ controller 300, the HARQ controller 300 transitions to the first state S1 after transmitting the decoding result, and waits again in the initial state to process the next state. For ACK/NAK Delay=2 slots, the HARQ controller 300 includes two HARQ state machines 310. In this case, the two HARQ state machines 310 can simultaneously perform the first state S1 or the sixth state S6. However, the other states S2, S3, S4 and S5 are never used simultaneously.

Figure 6:
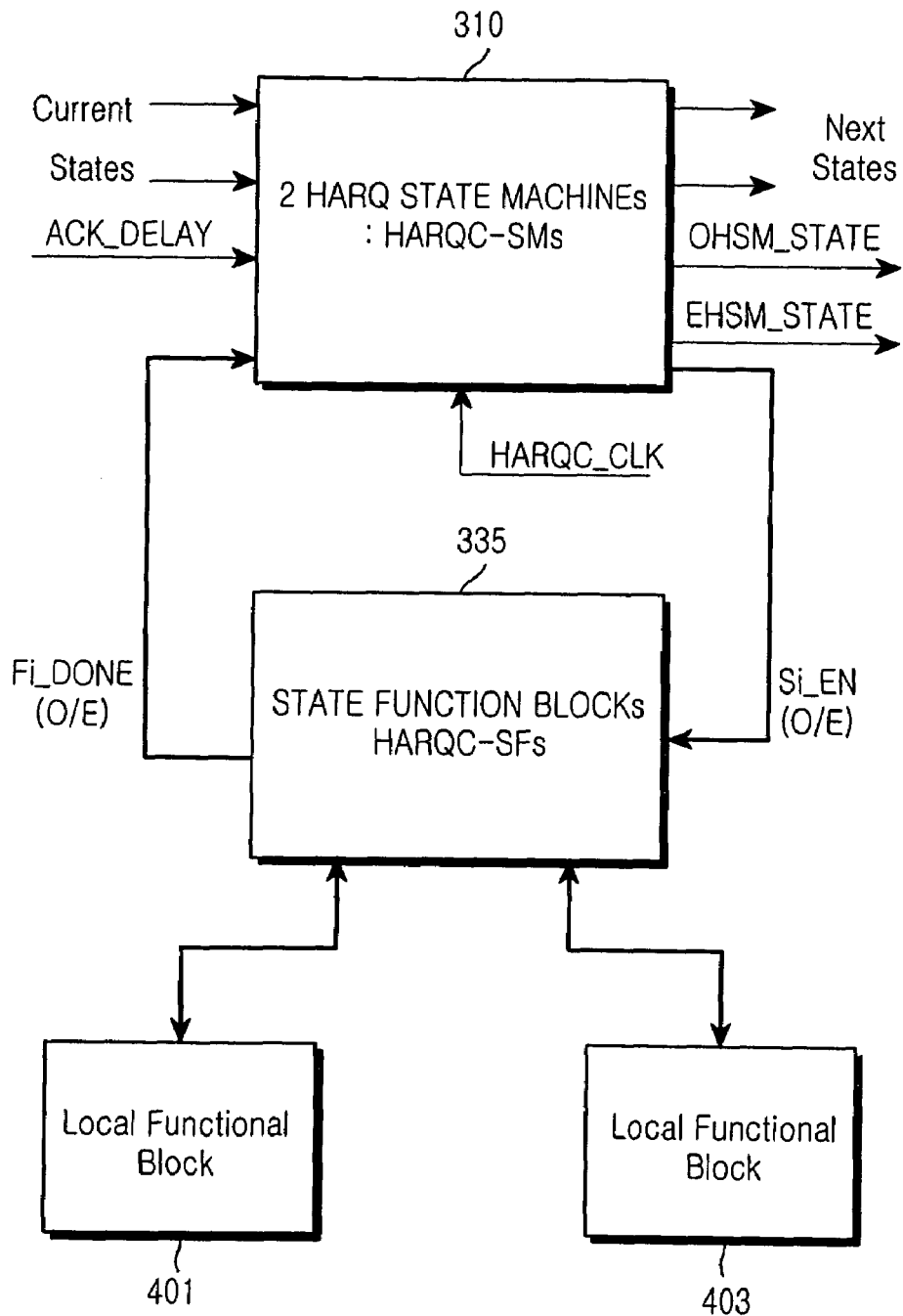
FIG. 6 is a block diagram illustrating the connection between a HARQ state machine and a state function section in a HARQ controller according to an embodiment of the present invention.

Next, an internal structure of the HARQ controller 300 will be described below. FIG. 6 is a block diagram illustrating the connection between a HARQ state machine and a state function section in a HARQ controller according to an embodiment of the present invention. With reference to FIG. 6, a detailed description will be made of the connection between a HARQ state machine and a state function section according to an embodiment of the present invention.

In FIG. 6, a state function section 335 represents a state function section separated from the state function and data path controller 330 of FIG. 5. The ARQ state machines 310 control state transition of the first to sixth states S1 to S6 according to a HARQ control flow. That is, the HARQ state machines 310 output state transition signals. The state function section 335 controls other blocks (local function blocks) 401 and 403 to control operations performed in the respective states. The other blocks 401 and 403 illustrated in FIG. 6 can include the processor 400 and the control channel decoder 410 to the acknowledgement signal transmitter 440 of FIG. 5, excluding the HARQ controller 300, and can also include other blocks which are not illustrated in FIG. 5. That is, the state function section 335 receives state signals output from the HARQ state machines 310, and control operations depending on the state signal.

The HARQ state machines 310 receive information on current states and information on whether ACK/NAK Delay is 1 slot or 2 slots, and also receives an operation-done signal Fi_DONE from the state function section 335. Since two HARQ state machines 310 are provided for ACK/NAK Delay=2 slots, the operation-done signal is applied to the respective HARQ state machines 310. Upon receiving the operation-done signal, the HARQ state machines 310 output next state signals. At this point, since two HARQ state machines 310 are provided for ACK/NAK Delay=2 slots, the respective HARQ state machines 310 output corresponding state information. In addition, the HARQ state machines 310 output a state enable signal Si_EN to the state function section 335 so as to perform a control operation according to the state information and the corresponding state.

That is, the HARQ state machines 310 are different in their number and operation according to whether ACK/NAK Delay is 1 slot or 2 slots. Herein, a detailed description of the embodiment of the present invention will be made with reference to when the number of the HARQ state machines 310 is 1 or 2.

For ACK/NAK Delay=1 slot, one HARQ state machine 310 is provided, so only one state enable signal is output to the state function section 335. Also, only one operation-done signal is provided from the state function section 335 to the HARQ state machine 310. However, for ACK/NAK Delay=2 slots, two HARQ state machines 310 are provided. In this case, HARQ state machines 310 are divided into a first HARQ state machine (or odd HARQ state machine (OHSM)) and a second HARQ state machine (or even HARQ state machine (EHSM)). The first and second HARQ state machines have the same structure, and compared with when one HARQ state machine is provided, the fourth state S4 is further provided as illustrated in Table 1. That is, the first and second HARQ state machines perform the same operation in which they generate the same outputs in response to the same inputs. However, this does not mean that the two HARQ state machines are identical in state progress. That is, OHSM and EHSM used are changed according to ACK/NAK Delay as illustrated in Table 2 below.

TABLE 2

| ACK_DELAY (slots) | # of State Machine to use |
|---|---|
| 1 | 1 (OHSM) |
| 2 | 2 (OHSM, EHSM) |

When this is implemented in a mobile station, in order to accept both ACK/NAK Delay=1 slot and ACK/NAK Delay=2 slots, 2 HARQ state machines are provided, and for ACK/NAK Delay=1 slot, only one HARQ state machine is enabled and the fourth state S4 is excluded preferably.

Figure 7:
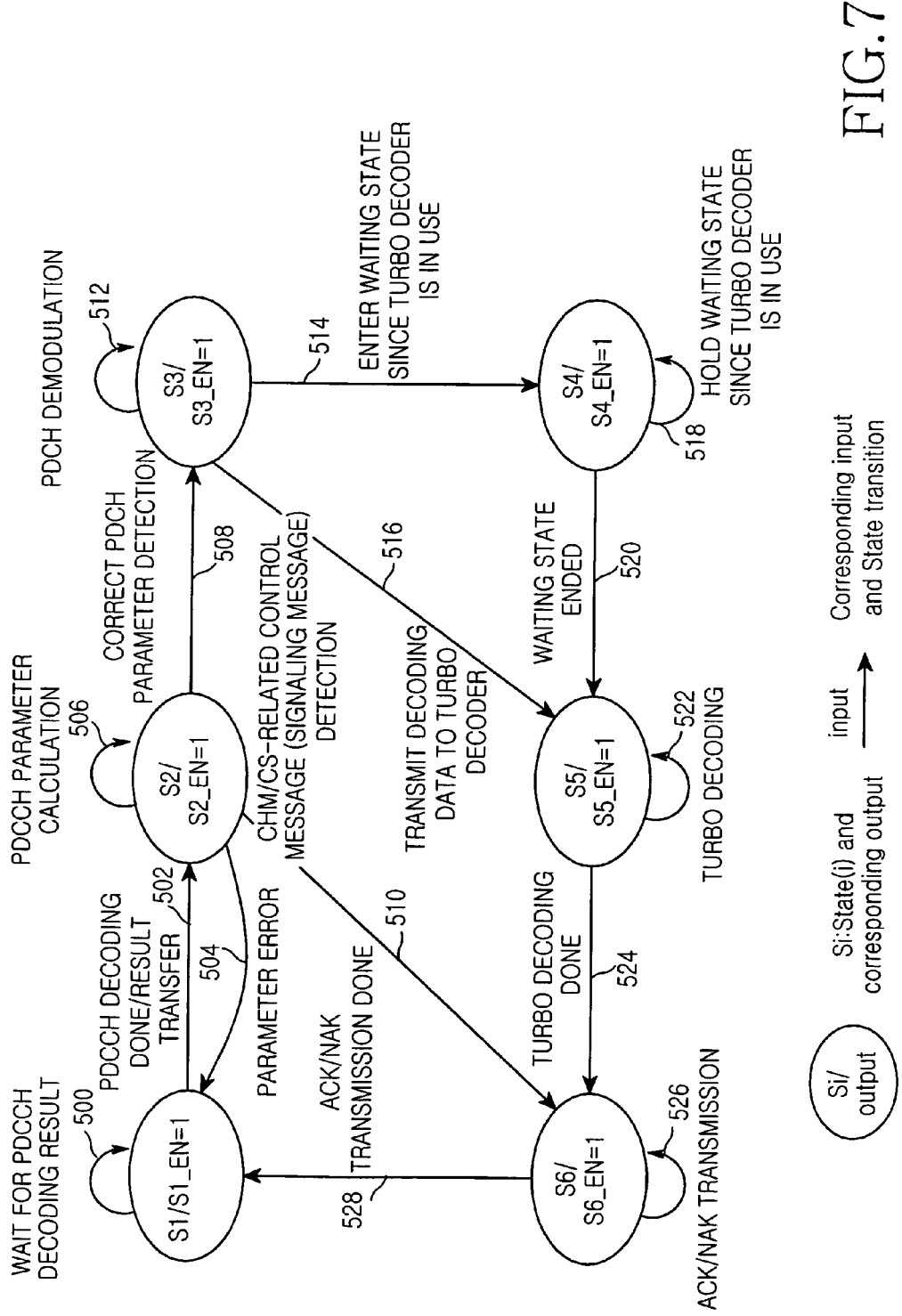
FIG. 7 is a state transition diagram of a HARQ controller according to an embodiment of the present invention.

Now, state transition of the respective states will be described with reference to FIG. 7. FIG. 7 is a state transition diagram of a HARQ controller according to an embodiment of the present invention.

The first state S1 represents a state where the HARQ controller 300 is waiting for decoding of a packet data control channel to be completed after performing initialization on a register, as described in conjunction with Table 1. In FIG. 7, step 500 represents a state where the HARQ controller 300 is waiting while holding the first state S1. If a decoding-done signal of a packet data control channel is received from the state function section 335 while the waiting state is held, transition occurs to the second state S2 in step 502. When transition to the second state S2 occurs, the HARQ state machine 310 calculates in step 506 such parameters as a modulation level necessary for demodulation and a Walsh code, using the decoding result of the packet data control channel in the first state S1. Furthermore, in the second state S2, the calculated parameters are error-checked. As a result of the error check, if a parameter error is detected, the HARQ state machine 310 proceeds to step 504 where it detects the occurrence of the parameter error, and then transitions back to the first state S1 (step 500). In contrast, when no error has occurred in the calculated parameters, the HARQ state machine 310 proceeds to step 508 where it detects a correct parameter of a packet data channel, delivers the detected parameter to the state function section 335, and then transitions to the third state S3. As a result of the parameter calculation in step 506, if a received message is a Control Hold Mode/Cell Switching (CHM/CS) related signaling message, the HARQ state machine 310 transitions not to the third state S3 but to the sixth state S6.

If transition to the third state S3 occurs, the HARQ state machine 310 demodulates a packet data channel in step 512. Such demodulation is controlled by the state function section 335, and the HARQ state machine 310 waits for the demodulation to be completed. Thereafter, if the demodulation is completed, the HARQ state machine 310 performs state transition according to whether ACK/NAK Delay is 1 slot or 2 slots. If ACK/NAK Delay is 1 slot, the HARQ state machine 310 proceeds to step 516 where it transitions to the fifth state S5. If ACK/NAK Delay is 2 slots, the HARQ state machine 310 proceeds to step 514 where it transitions to the fourth state S4. First, a description will be made regarding the case where ACK/NAK Delay is 2 slots, i.e., where the HARQ state machine 310 proceeds to step 514 and transitions to the fourth state S4.

When transition to the fourth state S4 takes place, the first or second HARQ state machine holds the waiting state since the data channel turbo decoder 430 is being used not by the HARQ state machine itself but by another HARQ state machine, When another HARQ state machine finishes its use of the data channel turbo decoder 430, the first or second HARQ state machine transitions to the fifth state S5 in step 520.

If transition occurs from the third state S3 or the fourth state S4 to the fifth state S5, the HARQ state machine 310 waits for turbo decoding to be completed in step 522. At this point, the turbo decoding is controlled by the state function section 335. If a turbo decoding-done signal is received from the state function section 335, the HARQ state machine 310 proceeds to step 524 where it transitions to the sixth state S6. The sixth state S6 represents a step in which ACK/NAK is transmitted as described in conjunction with Table 1. If transition to the sixth state S6 takes place, the state function section 335 controls the acknowledgement signal transmitter 440 to transmit ACK or NAK over a reverse channel according to the turbo decoding result. If transmission of ACK or NAK is done, the state function section 335 outputs an ACK/NAK transmission-done signal to the HARQ state machine 310. As a result, the HARQ state machine 310 proceeds to step 528 where it holds the first state S1.

As described above, the respective states have mutual relations with particular states, and state transitions occur according to the mutual relations. That is, transition to the first state S1 takes place when a specific event occurs in the sixth state S6 or the second state S2. In addition, the respective states have their own operations. In the currently available system, such operations, as described in the related art section, become a process that must be performed in the MAC layer 120 of the processor or a process performed in the HARQ controller 300 of the physical layer 200 according to an embodiment of the present invention. A detailed description will now be made of the second state S2 among others.

The second state S2 represents an operation performed in the HARQ controller 220 included in the physical layer 200. That is, the HARQ controller 220 is also included in the physical layer 200. Therefore, the HARQ state machines 310 included in the HARQ controller 300 are also included in the physical layer 200. The HARQ state machines 310 receive a state transition signal from the state function section 335. As stated above, transition to the second state S2 occurs only from the first state S1. That is, transition to the second state S2 occurs when the state function section 335 detects a decoding-done signal of a packet data control channel. Regarding the signal detection, a decoding-done signal of a packet data control channel is detected based on signals received from other function blocks 401 and 403 illustrated in FIG. 6. A description will now be made of a decoding operation in a mobile station supporting the 1×EV-DV standard.

A mobile station supporting the 1×EV-DV standard decodes packets received over a forward packet data control channel (F-PDCCH) every 1.25-msec slot when Radio Configuration 10 (RC10) is set up. One mobile station can simultaneously receive a maximum of 2 forward packet data control channels (F-PDCCHs), and when decoding of the F-PDCCHs is successful, control information that the mobile station can obtain from the decoding result is one of the following 4 types of information.

First obtainable information refers to information for demodulation and decoding of a forward packet data channel (F-PDCH), and second obtainable information refers to information indicating early termination of cell switching. Further, third obtainable information refers to information indicating switching to an active mode, and fourth obtainable information refers to information indicating points of unavailable Walsh codes (hereinafter referred to as "Walsh mask WALSH_MASK").

The Walsh mask information, the fourth obtainable information among the 4 types of information, is transmitted over only a first one of the two F-PDCCHs, whereas the other 3 types of information can be transmitted over either of the two F-PDCCHs. However, when one mobile station simultaneously receives two F-PDCCHs, a first F-PDCCH can include only Walsh mask information. The mobile station performs a different operation depending on which of the 4 types of information corresponds to control information that can be obtained from decoding result of the F-PDCCH. Therefore, a method for analyzing the decoding result of P-PDCCH and determining a preferable operation according to the analyzed control information is required. That is, the method becomes a process performed in the second state S2.

When decoding of F-PDCCH is successful, information input to the state function section 335 of the HARQ controller 300 becomes information received over a packet data control channel. A structure of a forward packet data control channel will now be described in detail with reference to FIG. 8A. Information received over a packet data control channel can be divided into two fields of a MAC ID field 610 and a service data unit (SDU) field 620. The MAC ID field 610 is comprised of 8 bits, and the SDU field 620 is comprised of 13 bits, so the entire packet data control channel receives information of 21 bits. Information transmitted over the MAC ID field 610 and the SDU field 620 will be described in more detail with reference to information summarized below and FIGS. 8B and 8D. Now, the information that is received over a packet data control channel and then input to the state function section 335 will be summarized herein below.

Figure 8A:
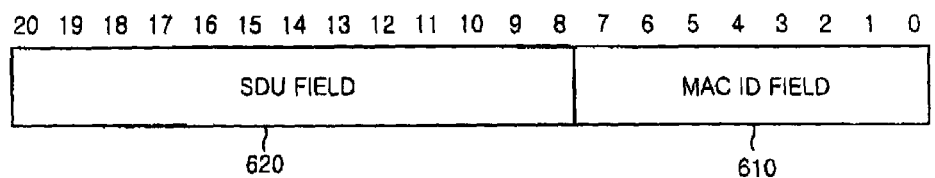
FIGS. 8A through 8D are diagrams illustrating possible structures of a packet data control channel.

1. MAC_ID_ALL0 (MAC ID all zero): refers to information indicating whether a first forward packet data control channel F-PDCCH0 includes a Walsh mask. That is, it indicates whether 8 bit values of the MAC ID field 610 of FIG. 8A are all 0s or not. MAC_ID_ALL0=1 refers to the first forward packet data control channel F-PDCCH0 including a Walsh mask. In contrast, MAC_ID_ALL0=0 refers to the first forward packet data control channel F-PDCCH0 including no Walsh mask. Although the MAC_ID_ALL0 can be defined in the opposite manner, it will be assumed herein that MAC_ID_ALL0=1 refers to a 13-bit Walsh mask being included in the SDU field 620. That is, it is assumed that MAC_ID_ALL0 is set to '1' when bit values of the MAC ID field 610 in the information received over the packet data control channel are all 0 as illustrated in FIG. 8D.

2. MAC_ID_OK: refers to information indicating whether any one of information on early termination of cell switching, information on switching to an active mode, and control information for demodulation and decoding of a forward packet data channel F-PDCH is included in a first forward packet data control channel F-PDCCH0 or a second forward packet data control channel F-PDCCH1. For example, MAC_ID_OK=0 indicates that none of the above information is included, while MAC_ID_OK=1 indicates that one of the above information is included. Of course, a value of MAC_ID_OK can be defined in the opposite manner.

3. PDCCH_ID (Packet Data Control Channel Identification): refers to information indicating an index of a forward packet data control channel (F-PDCCH) containing control information, for MAC_ID_OK=1. Therefore, this information can be expressed with one bit. For example, PDCCH_ID=0 indicates that the first forward packet data control channel F-PDCCH0 includes control information, while PDCCH_ID=1 indicates that the second forward packet data control channel F-PDCCH1 includes control information. Of course, a value of PDCCH_ID can be defined in the opposite manner.

4. PDCCH0_SDU: refers to information corresponding to the upper 13 bits in the decoding result of the first forward packet data control channel F-PDCCH0. That is, it refers to the upper 13 bits shown in FIG. 18A.

5. PDCCH1_SDU: refers to information corresponding to the upper 13 bits in the decoding result of the second forward packet data control channel F-PDCCH1. That is, it refers to the upper 13 bits shown in FIG. 18A.

6. NUM_SLOTS: refers to information indicating the number of slots over which a forward packet data control channel F-PDCCH and a forward packet data channel F-PDCH are transmitted. Therefore, NUM_SLOTS determines the number of bits according to the type of transmission slots. For example, NUM_SLOTS=0 indicates that transmission is performed for one slot, NUM_SLOTS=1 indicates that transmission is performed for two slots, and NUM_SLOTS=2 indicates that transmission is performed for four slots.

As described above, control information that can be commonly obtained from the decoding result of the first forward packet data control channel F-PDCCH0 or the second forward packet data control channel F-PDCCH1 is one of 3 types of information.

Figure 8B:
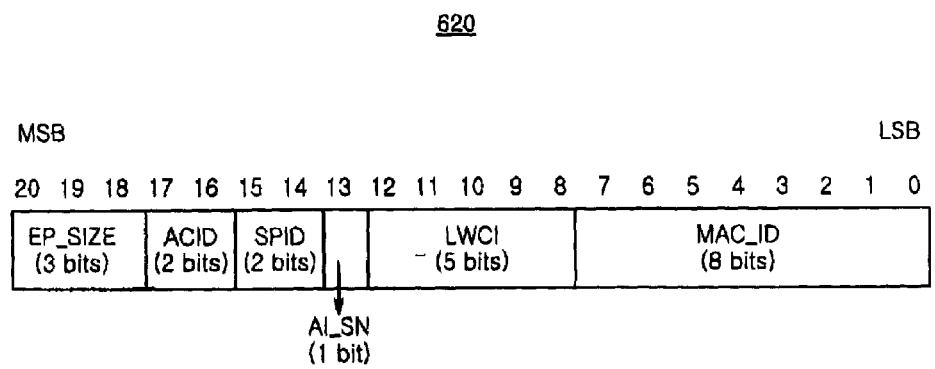

If control information acquired from the control channels among the 3 types of information is the information for demodulation and decoding of a forward packet data channel F-PDCH, then PDCCH0_SDU or PDCCH1_SDU has a format shown in FIG. 8B. The format will now be described with reference to FIG. 8B. In FIG. 8B, data included in the SDU field 620 is illustrated. The data format includes, from the most significant bit (MSB), 3-bit EP_SIZE indicating a size of an encoder packet, 2-bit ACID (ARQ channel ID) indicating an ID of an ARQ channel, 2-bit SPID (Subpacket ID) indicating an ID of a subpacket, 1-bit AL_SN (ARQ identifier Sequence Number) for transmitting a value toggled for each transmission of new packet data, and 5-bit LWCI (Last Walsh Code Index) which is the last Walsh code index information.

Figure 8C:
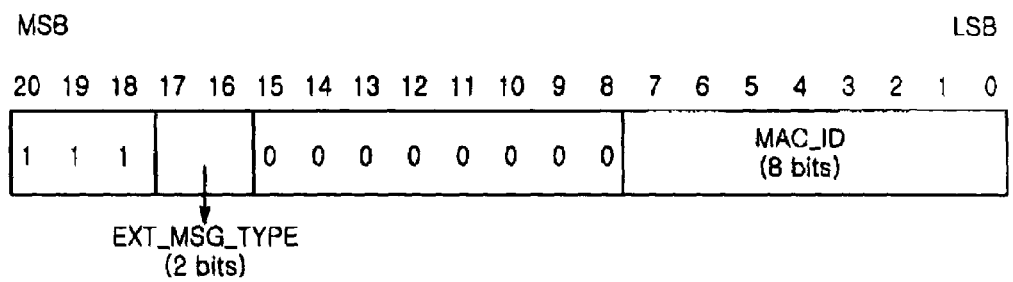
Figure 8D:
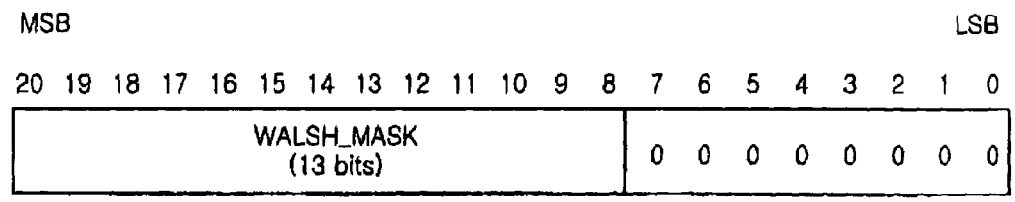

If control information acquired from the control channels among the 3 types of information is the information indicating early termination of cell switching or switching to an active mode, then the SDU field of the first forward packet data control channel or the second forward packet data control channel has a format shown in FIG. 8C. If the upper 3 bits indicating a size of an encoder packet are all 1 as illustrated in FIG. 8C, the following 2 bits become information indicating an extended message type EXT_MSG_TYPE, and the following 8 bits of the SDU field 620 all have a value of '0'. Such information becomes information indicating early termination of cell switching or switching to an active mode.

Finally, if control information acquired from the control channels among the 3 types of information is Walsh mask information, then the SDU field has a format shown in FIG. 8D. As illustrated in FIG. 8D, Walsh mask information WALSH_MASK that can be acquired only from the decoding result of the first forward packet data control channel F-PDCCH0 is included in the SDU field 620, and bit values of the MAC_ID field 610 are all 0. In addition, when 2 packet data control channels are assigned to one user, the packet data control channels must be transmitted in the format illustrated in FIG. 8D.

A description will now be made of an operation performed in the second state S2 by the HARQ state machines 310 and the state function section 335 based on the foregoing description.

A device for analyzing control information which is a decoding result of a forward packet data control channel, i.e., the state function section 335, performs the following function.

First, the state function section 335 determines the next state of the second state S2 according to an output of the second state S2. State transition information F2_STATUS of the second state S2 is determined based on a control flow described later. Therefore, a process of determining state transition information output in the second state S2 will be described later in more detail with reference to the control flow, and only the next state to which transition will occur according to the state transition information will now be described. If state transition information F2_STATUS of the second state S2 is '0', the next state is set to the first state S1. If state transition information F2_STATUS of the second state S2 is '1', the next state is set to the third state S3. Further, if state transition information F2_STATUS of the second state S2 is '2', the next state is set to the sixth state S6.

In addition, the state function section 335 generates parameters for an operation in the next state determined in the second state S2 in the above manner. If the next state is the first state S1, there is no parameter to generate because the first state S1 is a waiting state. However, if the next state is the third state S3 where demodulation of a packet data channel is performed, the following parameters are generated.

(1) EP_SIZE: it is information indicating a size of an encoder packet.

(2) ACID: it is information indicating an ID of an ARQ channel.

(3) MOD_ORDER: it is information indicating a modulation level.

(4) SP_LENGTH: it is information indicating a length of a subpacket.

(5) FS_POINT: it is information indicating a point of a first symbol in a subpacket.

(6) P_MAX: it is information indicating the total number of types of code symbols.

(7) QCTC_CLEAR: it is information indicating whether an input buffer of a turbo decoder is reset.

(8) PRE_EP_SIZE: it is information indicating a size of an encoder packet in a previous subpacket.

(9) PRE_EP_NEW: it is information indicating whether a previous subpacket is retransmitted.

Unlike this, if the next state of the second state S2 is the sixth state S6 where an ACK/NAK signal is transmitted in a reverse direction, the state function section 335 must generate the following parameters.

(1) INT_TRFC_R: it is an interrupt for informing an upper layer of traffic reception.

(2) INT_CSW_T: it is an interrupt for informing the upper layer of early termination of cell switching.

(3) CTRL_MSG: it is information indicating whether a decoding result of F-PDCCH includes an extended message indicating early termination of cell switching or switching to an active mode.

(4) INT_ACK: it is information indicating ACK/NAK determined without decoding of F-PDCH.

In addition, the second state S2, as described in connection with Table 1, is a state where parameters for New/Continue Decision on DEMOD_SIG_GEN Subpacket, extraction of signaling message, and PDCH demodulation are calculated. Therefore, the state function section 335 must perform a validity test for detecting an error of control information. That is, the state function section 335 must perform a validity test on Walsh mask information WALSH_MASK to output a validity test value WMASK_VLD for the Walsh mask, and perform a validity test on the number of Walsh codes to output a validity test value WALSH_VLD for the number of Walsh codes. A process of performing the above operation by the state function section 335 will now be described with reference to FIG. 9.

Figure 9:
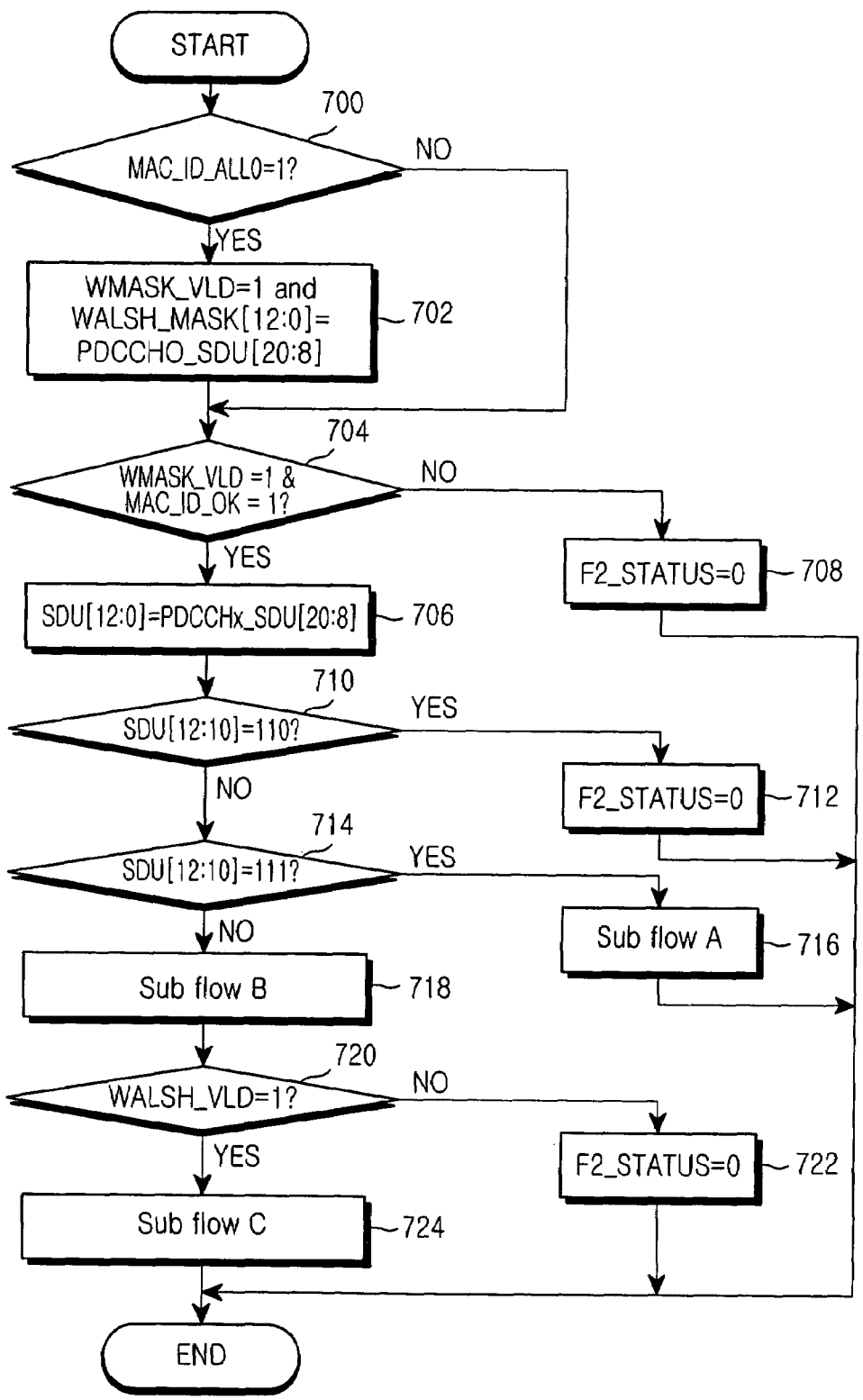
FIG. 9 is a flowchart illustrating a procedure for determining the next state in a second state using information received over a packet data control channel by a HARQ controller according to an embodiment of the present invention.

FIG. 9 is a flowchart illustrating a procedure for determining the next state in a second state using information received over a packet data control channel by a HARQ controller according to an embodiment of the present invention. With reference to FIG. 9, a description will now be made of a procedure for determining the next state in a second state by a HARQ controller and an operation performed in the second state according to an embodiment of the present invention.

In the embodiment of the present invention, two packet data control channels are used. The two packet data control channels can be transmitted in the following manner. First, one packet data control channel can be broadcasted to all mobile stations, and another packet data control channel can be transmitted to one particular mobile station. Second, the two packet data control channels can be independently transmitted to different mobile stations. Therefore, the mobile station must check both of the two packet data control channels. In addition, F2_DONE must be initialized to '0' before a flag SF2 indicating the second state S2 is initiated, and a second state flag F2_STATUS is set to '1'. Based on the foregoing description, the procedure will now be described.

The state function section 335 of the HARQ controller 300 analyzes a value of MAC_ID_ALL0 in the information received over a packet data control channel. If MAC_ID_ALL0 is '1', bit values of the MAC ID field 610 in the first packet data control channel PDCCH0 are all 0, and upper 13 bits of the packet data control channel have a Walsh mask value. If it is determined in step 700 that MAC_ID_ALL0 is '1', the state function section 335 proceeds to step 702, and otherwise, the state function section 335 proceeds to step 704. In step 702, since WALSH_MASK information, i.e., an unavailable field of a Walsh mask, is currently being transmitted, the state function section 335 sets WMASK_VLD to '1' in order to indicate reception of the WALSH_MASK information, sets the 13 bits received over the SDU field 620 of the first packet data control channel PDCCH0 to a Walsh mask WALSH_MASK[12:0], and then proceeds to step 704.

The state function section 335 determines in step 704 whether WMASK_VLD is set to '1' and at the same time whether MAC_ID_OK is set to '1'. This is a process of determining whether a message received over a packet data control channel is being transmitted toward its mobile station. Therefore, if it is determined in step 704 that WMASK_VLD is '0' or MAC_ID_OK is '0', the state function section 335 proceeds to step 708 where it sets a second state flag F2_STATUS to '0' and then ends the procedure. Otherwise, if it is determined in step 704 that both of the above two conditions are satisfied, the state function section 335 proceeds to step 706. In step 706, the state function section 335 defines information on the 13-bit SDU field 620 in a packet data control channel corresponding to PDCCH_ID as SDU information, and then proceeds to step 710. In step 710, the state function section 335 determines whether the upper 3 bits SDU[12:10] of the SDU information indicate '110'. The upper 3 bits of the SDU field 620 are set to '111' as illustrated in FIGS. 8B and 8C, or constitute a field indicating size information of an encoder packet. However, the information '110' is unused information. In this manner, the information '110' is analyzed to determine whether received information has an error. That is, if it is determined in step 710 that the upper 3 bits of the SDU field are set to '110', it indicates that an error exists in the received data, so the state function section 335 proceeds to step 712 where it sets the second state flag F2_STATUS to '0'.

In contrast, if it is determined in step 710 that the upper 3 bits of the SDU field are not set to '110', the state function section 335 determines in step 714 whether the upper 3 bits of the SDU field 620 are set to '111', in order to check whether information received over a packet data control channel is identical to the information shown in FIG. 8C, i.e., to check whether the received information indicates early termination of cell switching or switching to an active mode. If it is determined in step 714 that the upper 3 bits of the SDU field 620 are set to '111', the state function section 335 proceeds to step 716 where it extracts information shown in FIG. 8C, if received. That is, in this process, the state function section 335 determines whether information indicating early termination of cell switching or switching to an active mode was transmitted through the 2-bit extended message type EXT_MSG_TYPE information shown in FIG. 8C.

Figure 10:
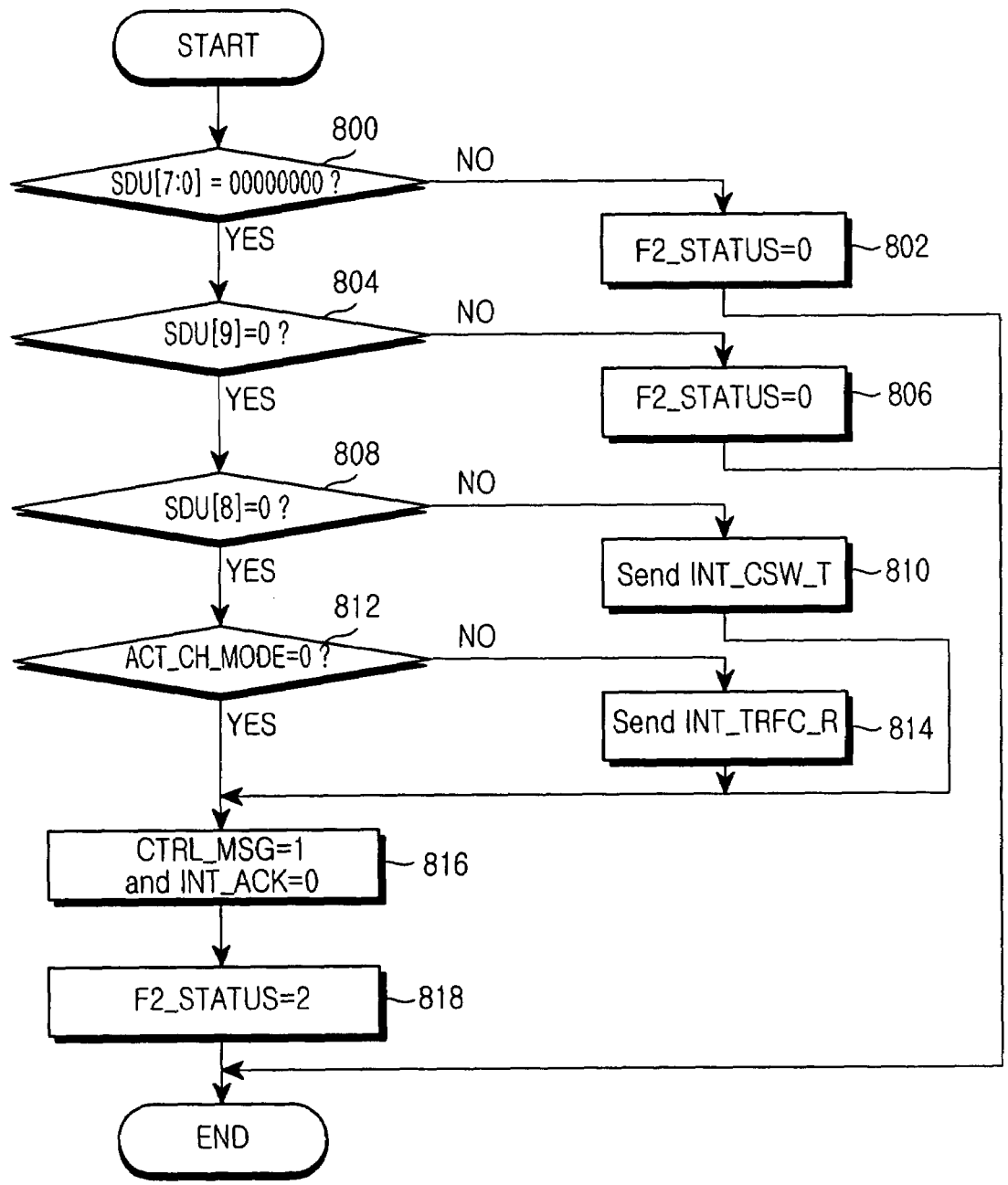
FIG. 10 is a detailed flowchart of a sub flow A of FIG. 9 in the control procedure upon detection of information received over a packet data control channel according to an embodiment of the present invention.

A detailed process of the step 716 will now be described with reference to FIG. 10. FIG. 10 is a detailed flowchart of a sub flow A of FIG. 9 in the control procedure upon detection of information received over a packet data control channel according to an embodiment of the present invention. In step 800, the state function section 335 of the HARQ controller 300 determines whether the lower 8 bits SDU[7:0] of the SDU field are all 0, in order to check whether information received over a packet data control channel has a format shown in FIG. 8C. If it is determined in step 800 that the lower 8 bits of the SDU field are not all 0, the state function section 335 proceeds to step 802 where it sets the second state flag F2_STATUS to '0' and then ends the routine of FIG. 10.

Otherwise, if it is determined in step 800 that the lower 8 bits of the SDU field are all 0, the state function section proceeds to step 804. In this case, since the upper 3 bits and the lower 8 bits among 13 bits of the SDU field are all normally received, it is possible to analyze all information by checking only SDU[9] and SDU[8] where the extended message type EXT_MSG_TYPE is located. In step 804, the state function section 335 of the HARQ controller 300 determines whether the upper 1 bit SDU[9] of the extended message type EXT_MSG_TYPE in the SDU field is set to '0'. The extended message type EXT_MSG_TYPE is set to '00' and '01'. Therefore, the upper 1 bit of the extended message type EXT_MSG_TYPE in the SDU field must be set to '0'. However, when the extended message type EXT_MSG_TYPE is set to other values, the flowchart should be modified.

It will be assumed herein that the extended message type EXT_MSG_TYPE is set in the above-stated method. If the upper 1 bit of the extended message type EXT_MSG_TYPE is set to '0', the state function section 335 proceeds to step 808. However, if the upper 1 bit of the extended message type EXT_MSG_TYPE is not set to '0', the state function section 335 proceeds to step 806. In step 806, the state function section 335 sets the second state flag F2_STATUS to '0', and then ends the routine of FIG. 10. That is, in this case, since a defective message is received, the routine is ended.

In step 808, the state function section 335 determines whether the other bit SDU[8] of the extended message type EXT_MSG_TYPE has a value of '0'. If it is determined in step 808 that the other bit has a value of '0', the state function section 335 proceeds to step 812, otherwise, the state function section 335 proceeds to step 810. The latter case will be described first. The extended message type EXT_MSG_TYPE is set to '01' to instruct a mobile station to terminate early the cell switching. Therefore, the state function section 335 of the HARQ controller 300 generates an interrupt called cell switching early termination INT_CSW_T in order to inform an upper layer of the fact. Upon receiving the interrupt, the upper layer performs an operation related to the cell switching early termination. An operation performed in the upper layer is not related to the gist of the present invention, so a description thereof will not be given.

A description will now be made of an operation performed when it is determined in step 808 that the other bit of the extended message type EXT_MSG_TYPE is set to '0', i.e., the EXT_MSG_TYPE is set to '00'. The EXT_MSG_TYPE is set to '00' in order to instruct a mobile station to switch to an active mode from a control hold mode. Therefore, the HARQ controller 300 must analyze information indicating a current state of the mobile station. In step 812, the state function section 335 determines whether ACT_CH_MODE indicating whether the mobile station is currently in an active mode or a control hold mode is set to '0' or '1'. ACT_CH_MODE=0 indicates that the mobile station is in an active mode, while ACT_CH_MODE=1 indicates that the mobile station is in a control hold mode. If it is determined in step 812 that ACT_CH_MODE is set to '0', the state function section 335 proceeds to step 816. However, if ACT_CH_MODE is set to '1', i.e., if the mobile station is in a control hold mode, the state function section 335 proceeds to step 814 where it generates a traffic reception interrupt INT_TRFC_R to inform the upper layer of reception of traffic. Upon receiving the interrupt, the upper layer will perform an operation related to switching to an active mode.

Thereafter, in step 816, the state function section 335 of the HARQ controller 300 proceeds to step 816 where it sets a control message CTRL_MSG indicating reception of an extended message to '1'. Further, the state function section 335 sets INT_ACK to '0' in order to indicate transmission of ACK. Thereafter, in step 818, the state function section 335 sets the second state flag F2_STATUS to '2' in order to inform the HARQ state machines 310 of the fact. Through such a process, the state function section 335 can receive the message of FIG. 8C over a packet data control channel.

Referring back to FIG. 9, if it is determined in step 714 that the upper 3 bits of the SDU field are not set to '111', the state function section 335 proceeds to step 718. In step 718, it is determined that as a result of analyzing the upper 3 bits of the SDU field 620, received information has no error and is different from the information shown in FIG. 8C. Because information received over a packet data control channel is not identical to the information shown in FIG. 8C, the state function section 335 performs a sub flow B of step 718 in order to check other states. The sub flow B of step 718 will be described herein below with reference to FIG. 11.

Figure 11:
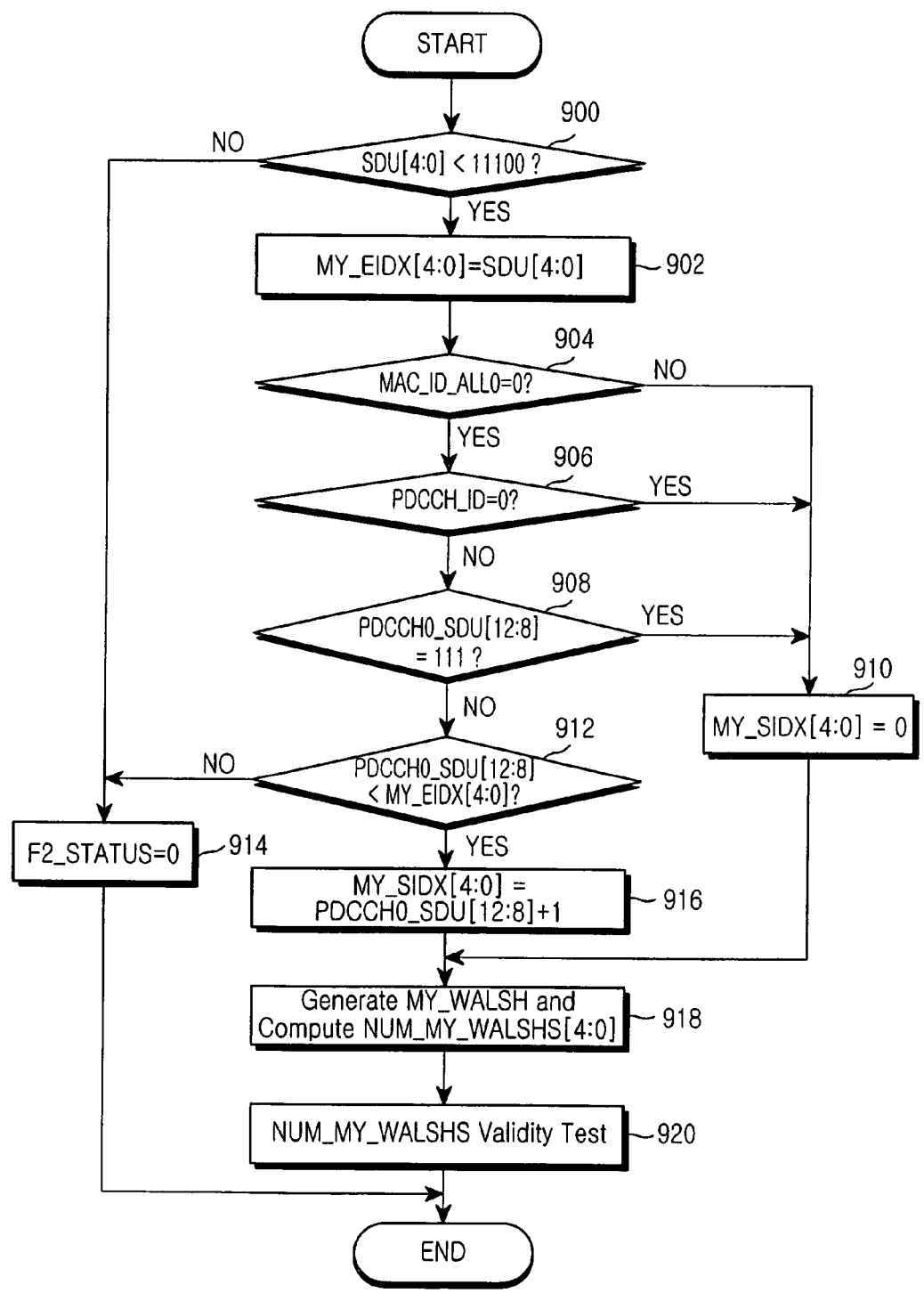
FIG. 11 is a detailed flowchart of the sub flow B of FIG. 9 in the control procedure upon detection of information received over a packet data control channel according to an embodiment of the present invention.

FIG. 11 is a detailed flowchart of the sub flow B of FIG. 9 in the control procedure upon detection of information received over a packet data control channel according to an embodiment of the present invention. The procedure of FIG. 11 is initiated when control information for demodulation and decoding of a forward packet data channel (F-PDCH) is transmitted over a first packet data control channel's SDU PDCCH0_SDU or a second packet data control channel' SDU PDCCH1_SDU. That is, the procedure of FIG. 11 is performed when MAC_ID_OK is '1' and SDU[12:10] is not '111'. The procedure of FIG. 11 is roughly divided into two operations. First, a Walsh code index set used for demodulation of a forward packet data channel (F-PDCH) is generated. Second, it is determined whether the number of Walsh codes to be used for demodulation of a forward packet data channel is valid. A detailed description will now be made of the two operations.

In step 900, the state function section 335 determines whether the lower 5 bits of the SDU field have a value lower than a decimal number of 28, i.e., a binary number of '11100'. The lower 5 bits of the SDU field become a value indicating a Walsh code index used for demodulation of a forward packet data channel. That is, it is determined in step 900 whether a Walsh code field is exceeded. If it is determined that the Walsh code field is exceeded, the state function section 335 proceeds to step 914. In step 914, the state function section 335 sets F2_STATUS to '0', and then ends the routine of FIG. 11.

However, if it is determined in step 900 that the Walsh code field is not exceeded, the state function section 335 proceeds to step 902. In step 902, the state function section 335 sets an end point MY_EIDX[4:0] of a Walsh code index of its received packet data channel to a last Walsh code index value LWCI of the SDU field 620 received over the packet data control channel. In this manner, the state function section 335 can easily detect an end point of a Walsh code index of its received packet data channel. However, a start point MY_SIDX of a Walsh code index of its received packet data channel has different values according to circumstances. The reason why a start point of a Walsh code index of a packet data channel has different values according to circumstances will be described herein below.

When MAC_ID_ALL0 is '1', Walsh mask information WALSH_MASK is included in a first packet data control channel's SDU PDCCH0_SDU, and information for demodulation and decoding of a forward packet data channel is included in a second packet data control channel's SDU PDCCH1_SDU. Therefore, an initial value of a start point MY_SIDX of its currently received Walsh code index becomes '0'. In addition, when MAC_ID_ALL0 is '0' and a packet data control channel's ID PDCCH_ID is '0', i.e., if control information is received over a first packet data control channel, then a start point MY_SIDX of a Walsh code index for its mobile station is set to '0' regardless of a start point of a Walsh code index for another mobile station.

Meanwhile, when MAC_ID_ALL0 is '0' and a packet data control channel's ID PDCCH_ID is '1', a start point MY_SIDX of its received Walsh code index is set to different values according to whether a forward packet data channel for another mobile station is established or not. For example, if a first packet data control channel's SDU PDCCH0_SDU includes an extended message for another mobile station, it means that a forward packet data channel for another mobile station is not established. Therefore, a start point MY_SIDX of a Walsh code index for a corresponding mobile station becomes '0'. However, if the first packet data control channel's SDU PDCCH0_SDU includes information necessary for demodulation and decoding of a forward packet data channel for another mobile station, '0' cannot be used for a start point of a Walsh code. That is, in this state, because another forward packet data channel for another mobile station has been established, a start point MY_SIDX of a Walsh code index received at a corresponding mobile station is set to a value 'PDCCH0_SDU[12:8]+1' determined by adding 1 to a value of the first packet data control channel's SDU, which is a point that goes one bit ahead of the start point of the Walsh code index for another mobile station. Here, the start point of a Walsh code index is set to a value determined by adding 1 to a value of the last Walsh index located in the SDU field 620 of the first packet data control channel because the last Walsh index value becomes a last index value of a Walsh code assigned to another user. Therefore, a start point of a Walsh code assigned to a corresponding mobile station begins at the next index of an index value of the last Walsh code.

The foregoing description can be summarized in Table 3 below. Here, when the determined start point MY_SIDX of a Walsh code index for a corresponding mobile station is larger than an end point MY_EIDX of a Walsh code index for the corresponding mobile station, an error is considered to have occurred.

TABLE 3

| MAC_ID_ALL0 | PDCCH_ID | MY_SIDX | MY_EIDX |
|---|---|---|---|
| 0 | 0 | 00000 | SDU[4:0] |
|  | 1 | PDCCH0_SDU[20:18] = 111: 0000 PDCCH0_SDU[20:18] ≠ 111: PDCCH0_SDU[12:8] + 1 | SDU[4:0] |
| 1 | 1 | 00000 | SDU[4:0] |

The procedure of FIG. 11 will be described based on the contents of Table 3 and the foregoing description. The state function section 335 analyzes both of the two packet data control channels in step 904. That is, the state function section 335 determines whether MAC_ID_ALL0 of one packet data control channel, i.e., a first packet data control channel, out of the two packet data control channels is set to '0'. If it is determined that MAC_ID_ALL0 is set to '0', it means that data having the format shown in FIG. 8D cannot be transmitted as stated above. Then, the information shown in FIG. 8C and the information shown in FIG. 8B can be independently received over the two packet data control channels, or the information shown in FIG. 8B can be received over the two packet data control channels.

Therefore, if it is determined in step 904 that MAC_ID_ALL0 is not '0', the state function section 335 of the HARQ controller 300 proceeds to step 910 where it sets a start point of a Walsh code index of a corresponding mobile station to '0'. The state function section 335 proceeds from step 904 to step 910 because information received over the first packet data control channel is identical to the information shown in FIG. 8D. However, if it is determined in step 904 that MAC_ID_ALL0 is '0', the state function section 335 must perform analysis by combining the two types of information that can be received over the first packet data control channel and the second packet data control channel as stated above. Therefore, the state function section 335 proceeds to step 906. The state function section 335 determines in step 906 whether an ID of a packet data channel for a corresponding mobile station is set to '0', i.e., indicates the first packet data control channel PDCCH0. If it is determined in step 906 that MAC_ID of the first packet data control channel PDCCH0 is identical to its MAC_ID, the state function section 335 proceeds to step 910 where it sets a start point MY_SIDX of a Walsh code index to '0'. However, if MAC_ID of the second packet data control channel PDCCH1 is identical to its MAC_ID, the state function section 335 proceeds step 908.

In step 908, the state function section 335 determines whether upper 3 bits of the SDU field received over the first packet data control channel PDCCH0 are '111'. This is to determine whether information received over the first packet data control channel PDCCH0 has the format shown in FIG. 8C. If the information received over the first packet data control channel PDCCH0 has the format shown in FIG. 8C, a Walsh code for a packet data channel is not assigned to another mobile station since the received information corresponds to early termination of cell switching. Therefore, the state function section 335 proceeds to step 910 where it sets a start point of a Walsh code index to '0' as stated above.

However, if it is determined in step 908 that the upper 3 bits received over the first packet data control channel PDCCH0 are not '111', it indicates that the information having the format shown in FIG. 8B is received over the first packet data control channel and the second packet data control channel. In addition, since it is determined from the foregoing analysis that a packet data control channel received at a corresponding mobile station becomes the second packet data control channel, a last point of a Walsh code for another mobile station becomes information indicating a start point of its Walsh code index. Therefore, the state function section 335 proceeds to step 912 there it compares a last Walsh code index value of the SDU field 620 of the first packet data control channel for another mobile station with its own last Walsh code index value. If the last Walsh code index value received over the first packet data control channel, used in another mobile station, is larger than the last Walsh code index value for the corresponding mobile station, the information becomes abnormal data. Therefore, the state function section 335 determines in step 912 whether the last Walsh code index PDCCH0_SDU[12:8] of the first packet data control channel is smaller than the last Walsh code index for the corresponding mobile station, i.e., the last Walsh code index MY_EDIX[4:0] set in step 902. If it is determined in step 912 that the last Walsh code index PDCCH0_SDU[12:8] of the first packet data control channel is not smaller than its last Walsh code index, the state function section 335 proceeds to step 914 where it sets WALSH_VLD to '0' to indicate abnormality of the Walsh code and then ends the routine.

However, in a normal case, it is determined in step 912 that the last Walsh code index PDCCH0_SDU[12:8] of the first packet data control channel is smaller than a last Walsh code index for the corresponding mobile station. In this case, the state function section 335 proceeds to step 916. In step 916, the state function section 335 sets a state point MY_SIDX[4:0] of a Walsh code index for the corresponding mobile station to a value determined by adding 1 to the first packet data control channel's SDU PDCCH0_SDU[12:8]. That is, the state function section 335 sets the next point of the last point of the packet data control channel for another mobile station to a start point of a Walsh code index. Thereafter, the state function section 335 proceeds to step 918. In step 918, the state function section 335 generates a Walsh code set MY_WALSH for the corresponding mobile station, and then calculates a Walsh number NUM_MY_WALSH[4:0] for the corresponding mobile station with 5-bit information. After calculating the Walsh number for the corresponding mobile station, the state function section 335 proceeds to step 920 where it performs a validity test on the Walsh code for the corresponding mobile station, and then ends the routine of FIG. 11. After completion of the routine, the state function section 335 returns to step 720 of FIG. 9.

Referring to FIG. 9, a description will be made of an operation performed in the second state S2 by the state function section 335. After the sub flow B, the state function section 335 proceeds to step 720 there it determines whether the Walsh code is valid, i.e., WALSH_VLD is set to '1'. If it is determined in step 720 that the Walsh code is valid, the state function section 335 proceeds to step 724 where it performs a sub flow C. However, if it is determined in step 720 that the Walsh code is invalid, the state function section 335 proceeds to step 722 where it sets a flag status F2_STATUS of the second state S2 to '0', and then ends the process for the second state S2. Based on such a flag status value, the HARQ state machines 310 of the HARQ controller 300 indicates the next state and performs a corresponding operation.

Figure 12:
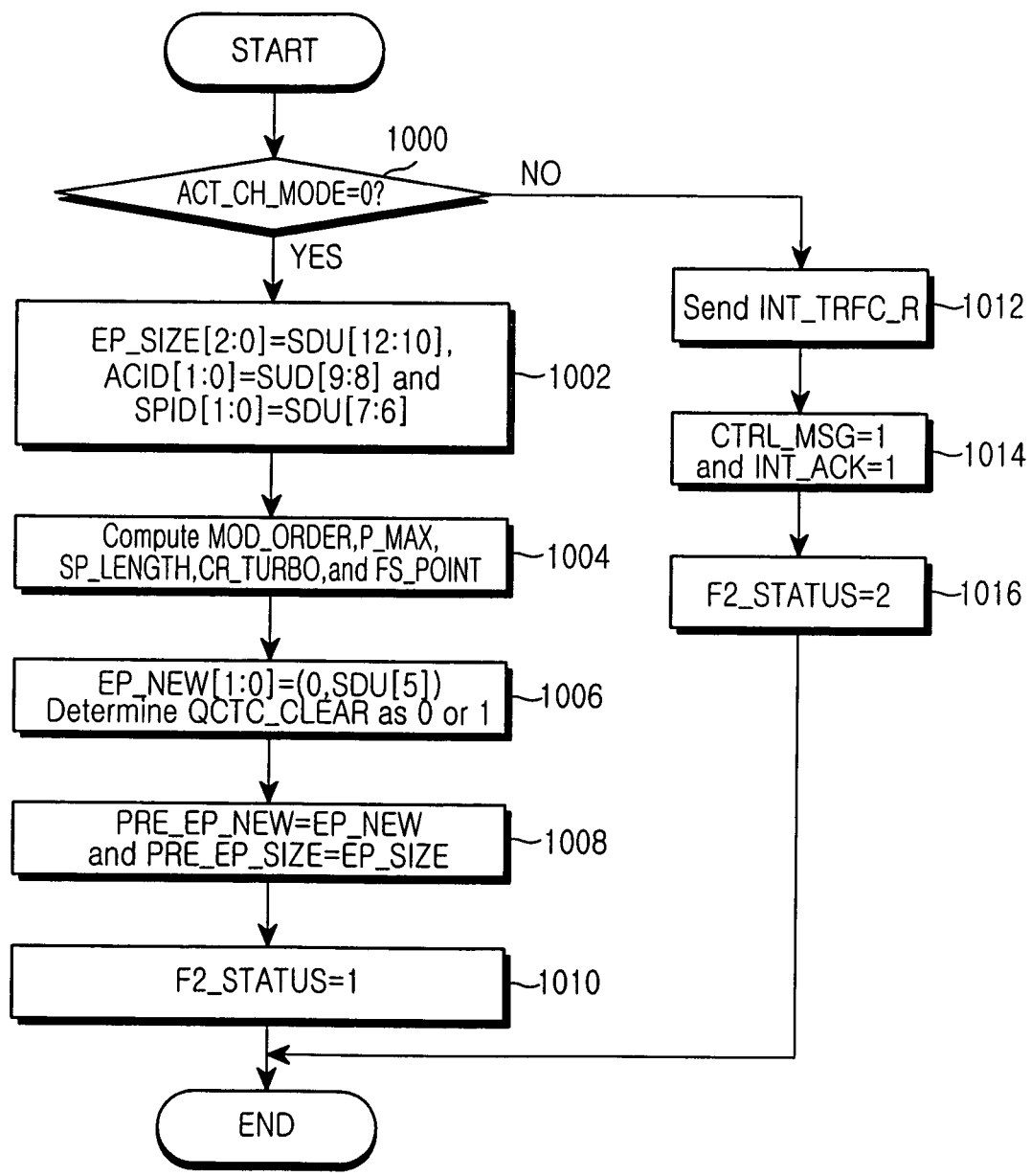
FIG. 12 is a detailed flowchart of the sub flow C of FIG. 9 in the control procedure upon detection of information received over a packet data control channel according to an embodiment of the present invention.

Next, with reference to FIG. 12, a detailed description will be made of the sub flow C of FIG. 9. FIG. 12 is a detailed flowchart of the sub flow C of FIG. 9 in the control procedure upon detection of information received over a packet data control channel according to an embodiment of the present invention. In the process of FIG. 12, the state function section 335 generates information for demodulation and decoding of a packet data channel.

As it enters the sub flow C, the state function section 335 determines in step 1000 whether a current mode of the mobile station is an active mode. That is, the state function section 335 determines whether a current mode of the mobile station is an active mode or a control hold mode. If the mobile station is in a control hold mode state, the state function section 335 must take necessary measures in order to process data received over a packet data channel. That is, the HARQ controller 300 must generate a traffic reception interrupt signal INT_TRFC_R in order to inform an upper layer of reception of traffic. Upon receiving the interrupt signal, the upper layer will perform an operation related to switching to an active mode. After completion of the operation, the HARQ controller 300 must set the status flag F2_STATUS of the second state S2 to '2' to indicate that the next state is the sixth state S6.

However, if it is determined in step 1000 that a current mode of the mobile station is an active mode, the state function section 335 of the HARQ controller 300 proceeds to step 1002. In step 1002, the state function section 335 sets upper 3 bits SDU[12:10] of the SDU field received over the packet data control channel to a size of the encoder packet. Further, the state function section 335 sets an ARQ channel ID ACID to 2-bit SDU SDU[9:8] after excluding the upper 3 bits of the SDU field received over the packet data control channel. In addition, the state function section 335 sets the subpacket ID SPID by extracting 2-bit SDU SDU[7:6] from a field following the ARQ channel ID, i.e., the field shown in FIG. 8B.

After step 1002, the state function section 335 proceeds to step 1004 where it calculates a modulation order MOD_ORDER, a maximum subpacket length P_MAX, a subpacket length SP_LENGTH, code rate information CR_TURBO, and subpacket's start point information FS_POINT. The state function section 335 having the values calculated in step 1004 proceeds to step 1006. In step 1006, the state function section 335 determines whether a currently transmitted encoder packet is an initially transmitted encoder packet or a retransmitted encoder packet, using a HARQ indication sequence number AI_SN which is toggled according to the transmission state. If it is determined that the currently transmitted encoder packet is an initially transmitted encoder packet, the state function section 335 sets QCTC_CLEAR to '1' so as to initialize an input buffer of a turbo encoder. Otherwise, if it is determined that the currently transmitted encoder packet is a retransmitted encoder packet, the state function section 335 sets QCTC_CLEAR to '0' so as to soft-combine the contents in the input buffer of the turbo encoder with a currently received subpacket.

Thereafter, the state function section 335 proceeds to step 1008 where it updates EP_NEW for a previously received encoder packet, i.e., PRE_EP_NEW, to EP_NEW for a new encoder packet. After updating a size PRE_EP_NEW of a previously received encoder packet to a size EP_NEW of a currently received new encoder packet, the state function section 335 proceeds to step 1010. In step 1010, the state function section 335 sets a status flag F2_STATUS of the second state S2 to '1' after generating the above information in order to indicate that the next state is the third state S3. Through such a process, the state function section 335 can correctly demodulate and decode the information received later over a packet data channel.

Next, a description will be made of a validity test on the number of Walsh codes according to an embodiment of the present invention. The validity test on the number of Walsh codes can be performed by checking the number of Walsh codes available for a corresponding mobile station. In other words, the state function section 335 determines whether the number NUM_MY_WALSHS of Walsh codes available for the corresponding mobile station is identical to the number of Walsh codes available from a combination of EP_SIZE received over SDU of the corresponding packet data channel, i.e., SDU[12:10], and NUM_SLOTS. If NUM_MY_WALSHS is identical to the number of available Walsh codes, the state function section 335 sets WALSH_VALID to '1'. However, if NUM_MY_WALSHS is not identical to the number of available Walsh codes, the state function section 335 sets WALSH_VALID to '0'. In this manner, the state function section 335 determines whether NUM_MY_WALSHS is valid.

The method used in the present invention defines combinations of parameters for RC10 forward packet data channels (F-PDCHs) as Table 3.1.3.1.13.4-1 in 3GPP2 C.S0002-C which is a standard for a 1×EV-DV physical layer. There are a total of 127 combinations defined in the above table, and each of the combinations has unique information on a size EP_SIZE of an encoder packet, the number NUM_SLOTS of slots and the number NUM_MY_WALSHS of Walsh codes available for a corresponding mobile station. The 127 combinations can be classified according to 23 different data rates. Here, because the data rate is a function of only the encoder packet size EP_SIZE and the slot number NUM_SLOTS, each of the 127 different parameter combinations belongs to one of 23 sets having different encoder packet sizes EP_SIZE and slot numbers NUM_SLOTS.

Since each of the 23 sets of encoder packet sizes EP_SIZE and slot numbers NUM_SLOTS has one or more encoder packet sizes EP_SIZE, slot numbers NUM_SLOTS and Walsh code numbers NUM_MY_WALSHS available for a corresponding mobile station as its elements, the number of types of the Walsh code numbers NUM_MY_WALSHS available for the corresponding mobile station that a set of an encoder packet size EP_SIZE and a slot number NUM_SLOTS can have is one or more. Here, it can be found out from the parameter table for the RC10 forward packet data channel that a Walsh code number NUM_MY_WALSHS available for the corresponding mobile station that a set of an encoder packet size EP_SIZE and a slot number NUM_SLOTS can have is matched to one of 16 different sets. This can be illustrated in Table 4 below. In Table 4, 23 sets of encoder packet sizes EP_SIZE and slot numbers NUM_SLOTS are classified according to data rate indexes of 0 to 22 (DR_IDX: 0→22) in order of size, and the Walsh code number NUM_MY_WALSHS available for the corresponding mobile station that each set can have is matched to one of 16 sets (NWS_IDX: 0→15).

For example, in the case of a DR_IDX=16 set of an encoder packet size EP_SIZE and a slot number NUM_SLOTS, i.e., a (100,00) set of an encoder packet size EP_SIZE and a slot number NUM_SLOTS, a Walsh code number NUM_MY_WALSHS available for a corresponding mobile station includes 21, 23 and 26 as its elements. Therefore, a Walsh code number NUM_MY_WALSHS available for a corresponding mobile station for the DR_IDX=16 set of an encoder packet size EP_SIZE and a slot number NUM_SLOTS can be matched to an NWS_IDX=11 set, i.e., {21, 23, 26}.

In Table 4, NWS_IDX denotes an index indicating a set for a Walsh code number NUM_MY_WALSHS available for a corresponding mobile station, and NOW_SET denotes existing possibility of a Walsh code number NUM_MY_WALSHS available for each of mobile stations #1 to #28 from the least significant bit (LSB) to the most significant bit (MSB). In Table 4, '0' means that there is no existing possibility, while '1' means that there is existing possibility. For example, in the case of NWS_IDX=11, $21^{st}$, $23^{rd}$ and $26^{th}$ bits from the LSB of NOW_SET are expressed with '1', so NUM_MY_WALSHS must be one of 21, 23 and 26, and there is no possibility that other values are used as NUM_MY_WALSHS, so WALSH_VLD is set to 0.

The above-described validity test process on NUM_MY_WALSHS can be summarized as follows.

1. DR_IDX corresponding to an (EP_SIZE, NUM_SLOTS) set is given.
2. A value NOW_SET[NUM_MY_WALSHS] of a bit where its bit position in NOW_SET corresponding to the given DR_IDX indicates NUM_MY_WALSHS is read and this value is set as WALSH_VALID value.

transmitted. Further, a part for performing the succeeding processes is related to the sub flow A.

Finally, a third part determines whether information for demodulation and decoding of a forward packet data channel was transmitted over a first packet data control channel's SDU field PDCCH0_SDU or a second packet data control channel's SDU field PDCCH1_SDU. Further, a part for performing the succeeding processes is related to the sub flow B and the sub flow C. The sub flow B is a procedure for generating a Walsh code index to be used for demodulation of a forward packet data channel and determining whether there is an error in the number of Walsh codes to be used for demodulation of a forward packet data channel. The sub flow C is a procedure for calculating parameters for demodulation and decoding of a forward packet data channel and determining QCTC_CLEAR which is a parameter value for determining whether to retransmit a received subpacket.

In the procedure of FIG. 9, events proceeding to step 702, 708, 712, 716 or 722 correspond to a process in which the next state is set to the first state S1 due to an error existing in the

TABLE 4

| (EP_SIZE, NUM_SLOTS) | DR_IDX | Set of NUM_MY_WALSHS | NWS_IDX | NOW_SET |
|---|---|---|---|---|
| 000 00 | 0 | 3, 4, 5, 6, 7, 8, 11, 19 | 0 | 0000000001000000010011111100 |
| 000 01 | 1 | 2, 3, 4, 5, 8 | 1 | 0000000000000000000010011110 |
| 000 10 | 2 | 1, 2, 3, 4 | 2 | 0000000000000000000000001111 |
| 001 00 | 4 | 6, 7, 8, 9, 10, 11, 13, 15, 19 | 3 | 0000000001000101011111100000 |
| 001 01 | 5 | 3, 4, 5, 6, 7, 8, 11, 19 | 0 | 0000000001000000010011111100 |
| 001 10 | 6 | 2, 3, 4, 6, 11 | 4 | 0000000000000000010000101110 |
| 010 00 | 8 | 11, 12, 13, 15, 17, 19, 21, 22, 25 | 5 | 0001001101010101110000000000 |
| 010 01 | 9 | 6, 7, 8, 9, 10, 11, 13, 15, 20 | 6 | 0000000010000101011111100000 |
| 010 10 | 10 | 3, 4, 5, 6, 7, 9, 14 | 7 | 0000000000000010000101111100 |
| 011 00 | 12 | 16, 18, 20, 23, 25, 28 | 8 | 1001010010101000000000000000 |
| 011 01 | 13 | 8, 9, 10, 11, 13, 15, 17, 20, 23 | 9 | 0000010010010101011110000000 |
| 011 10 | 14 | 4, 5, 6, 7, 8, 9, 11, 14, 20 | 10 | 0000000010000010010111111000 |
| 100 00 | 16 | 21, 23, 26 | 11 | 0010010100000000000000000000 |
| 100 01 | 17 | 11, 12, 13, 15, 17, 19, 21, 22, 25 | 5 | 0001001101010101110000000000 |
| 100 10 | 18 | 6, 7, 8, 9, 10, 11, 13, 16, 20 | 12 | 0000000010001001011111100000 |
| 101 00 | 20 | 26 | 13 | 0010000000000000000000000000 |
| 101 01 | 21 | 13, 14, 15, 17, 19, 21, 23, 25, 27 | 14 | 0101010101010111000000000000 |
| 101 10 | 22 | 7, 8, 9, 11, 12, 14, 16, 19 | 15 | 0000000001001010110111000000 |

The above-described contents of FIG. 9 will be summarized herein below. FIG. 9 can be roughly divided into 3 major parts. Here, as stated above, the second state-done flag F2_DONE must be initialized to '0' before beginning of the second state S2, and is set to '1' after the status flag F2_STATUS of the second state S2 is determined. Thereafter, among the 3 parts of FIG. 9, a first part determines whether a Walsh mask which is position information of an unavailable Walsh code is transmitted over a first packet data control channel's SDU field PDCCH0_SDU and then performs its succeeding processes. In the first case, MAC_ID_ALL0=1 means that unavailable field information of the Walsh mask was transmitted over the first packet data control channel. Therefore, validity WMASK_VLD of the Walsh mask is set to '1' and a Walsh mask WALSH_MASK which is a register in the HARQ controller 300 is set with upper 13 bits of a first packet data control channel's SDU field PDCCH0_SDU.

Next, a second part is a process of acquiring an extended message over a first packet data control channel's SDU field PDCCH0_SDU or a second packet data control channel's SDU field PDCCH1_SDU. That is, the second part determines whether information indicating early termination of cell switching or indicating switching to an active mode was first packet data control channel's SDU field PDCCH0_SDU or the second packet data control channel's SDU field PDCCH1_SDU, or an extended message is received over the first packet data control channel's SDU field PDCCH0_SDU or the second packet data control channel's SDU field PDCCH1_SDU. That is, in this case, the next state is set to the sixth state S6 because of transmission of information indicating early termination of cell switching or indicting switching to an active mode. Meanwhile, when the procedure proceeds up to the sub flow C, the next state is set to one of the third state S3 and the sixth state S6.

MAC_ID_ALL0, MAC_ID_OK and PDCCH_ID used in the procedure are all received from a decoder for a forward packet data control channel, and meanings of combinations of the received values will be described below. First, SF2 starts its operation when MAC_ID_ALL0 or MAC_ID_OK is '1'. In this case, possible combinations of MAC_ID_ALL0 and MAC_ID_OK are (0,1), (1,0) and (1,1). Table 5 below shows information indicated by upper 13 bits of the first packet data control channel's SDU field PDCCH0_SDU and the second packet data control channel's SDU field PDCCH1_SDU according to whether a value of PDCCH_ID is 0' or '1'.

TABLE 5

| MAC_ID_ ALL0 | MAC_ ID_OK | PDCCH_ID | Information indicted by upper 13 bits of PDCCH_SDU |
|---|---|---|---|
| 0 | 1 | 0 | PDCCH0: information for F-PDCH demodulation and decoding PDCCH1: Uncertain |
| | | 1 | PDCCH0: Uncertain PDCCH1: information for F-PDCH demodulation and decoding |
| 1 | 0 | 0 or 1 | PDCCH0: WALSH_MASK PDCCH1: No information |
| | 1 | 1 | PDCCH0: WALSH_MASK PDCCH1: information for F-PDCH demodulation and decoding |

Through the operation described above, it is possible to reduce a load of an upper layer by arranging a HARQ controller in a physical layer, and information received over a packet data control channel in a state defined as a second state can be efficiently used in a 1×EV-DV system by determining whether the received information is defective or normal.

As described above, by arranging a HARQ controller in a physical layer in a mobile communication system, it is possible to efficiently process information on a packet data control channel without giving a load on an upper layer.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A Hybrid Automatic Repeat reQuest (HARQ) control apparatus for detecting a message received over a packet data control channel in a mobile communication system in which a base station transmits a packet data control message over at least one packet data control channel and transmits packet data to a mobile station over a packet data channel, the apparatus comprising:
   a control channel decoder for decoding a control message received over the packet data control channel;
   a HARQ controller of a physical layer, for receiving the decoded control message from the control channel decoder, determining based on the decoded control message at least one of whether to perform demodulation and decoding on a packet received over the packet data channel, whether to update a Walsh mask, and whether to perform state transition on the mobile station, and performing, based on the determination, at least one of outputting demodulation and decoding parameters, updating a Walsh mask, and outputting a state transition value to an upper layer;
   a data channel demodulator for demodulating packet data received over the packet data channel upon receiving a demodulation parameter from the HARQ controller; and
   a decoder for decoding the packet data demodulated by the data channel demodulator upon receiving a decoding parameter from the HARQ controller;
   wherein the HARQ controller comprises:
   a state function section for extracting demodulation and decoding parameters for packet data received over a packet data channel from a control message received from the control channel decoder, outputting the extracted parameters to the data channel demodulator and the decoder, and outputting current state information of the data channel demodulator and the decoder; and
   a HARQ state machine for determining a next state using the current state information of the data channel demodulator and the decoder, and output from the state function section;
   wherein the parameter output from the state function section to the data channel demodulator and the decoder includes a start point and a last point of an available Walsh code, information on whether a received packet is an initially transmitted packet or a retransmitted packet, a value indicating the number of transmissions for received packet data, size information of packet data, and a demodulation level.

2. The apparatus of claim 1, wherein the HARQ controller performs a validity test on a Walsh mask if the decoded control message is Walsh mask information and updates a current Walsh mask into the decoded Walsh mask if the Walsh mask is valid.

3. The HARQ control apparatus of claim 1, wherein the state function section transmits, if information indicating early termination of cell switching and/or switching to an active mode is received from the control channel decoder, the received information to an upper layer.

4. A method for detecting a message received over a packet data control channel in a physical layer included in a mobile station of a mobile communication system in which a base station transmits a packet data control message over at least one packet data control channel and transmits packet data to the mobile station over a packet data channel, the method comprising the steps of:
   decoding a control message received over the packet data control channel;
   determining whether the decoded control message is transmitted to the mobile station, and determining whether the decoded control message is for demodulation and decoding of a packet data channel if the decoded control message is transmitted to the mobile station;
   if the decoded control message is for demodulation and decoding of a packet data channel, calculating demodulation and decoding parameters for the packet data;
   determining a state of the physical layer using the decoded control message;
   performing demodulation and decoding on the packet data channel according to the decoded control message;
   determining whether the decoded control message indicates early termination of cell switching; and
   if the decoded control message indicates early termination of cell switching, generating a message indicating early termination of cell switching and sending the generated message to an upper layer.

5. The method of claim 4, further comprising the steps of:
   performing a validity test on a Walsh mask if the decoded control message is Walsh mask information; and
   updating a current Walsh mask into the decoded Walsh mask if the Walsh mask is valid.

6. The method of claim 4, wherein the step of calculating demodulation and decoding parameters comprises the steps of:
   determining whether a control message was received over two packet data control channels;
   determining whether a packet data control channel transmitted to the mobile station is a first packet data control channel;
   if a packet data control channel transmitted to the mobile station is a first packet data control channel, setting a start point of a Walsh mask to a first point of a Walsh mask and setting a last point of a Walsh mask;

determining whether the determined Walsh mask is valid, and determining whether a state of the mobile station is an active state if the determined Walsh mask is valid; and if the determined Walsh mask is not valid, generating a control message for transition to the active state, and sending the generated control message to an upper layer.

7. The method of claim 6, further comprising the step of determining, if a state of the mobile station is an active state, a size of an encoder packet of a packet data channel, an Identification (ID) of a retransmission channel and a subpacket ID, and calculating a demodulation level and a decoding parameter.

8. The method of claim 7, wherein the decoding parameter includes information indicating the total number of code symbol types, information indicating a length of a subpacket, code rate information, and start point information of the subpacket.

9. The method of claim 6, further comprising the steps of:

if a packet data control channel transmitted to the mobile station is not a first packet data control channel, determining whether a control message for demodulation and decoding of a packet data channel was transmitted over both of first and second packet data control channels; and if a control message for demodulation and decoding of a packet data channel was transmitted over both of first and second packet data control channels, calculating a start point of a Walsh mask from last Walsh information of the first packet data control channel and calculating a parameter for demodulation and decoding of a packet data channel from the packet data control channel transmitted to the mobile station.

10. The method of claim 4, further comprising the step of generating a message indicating a next state of the mobile station according to the decoded control message.

* * * * *

UNITED STATES PATENT AND TRADEMARK OFFICE
CERTIFICATE OF CORRECTION

PATENT NO.        : 7,639,659 B2                    Page 1 of 1
APPLICATION NO.   : 10/793934
DATED             : December 29, 2009
INVENTOR(S)       : Ha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1563 days.

Signed and Sealed this

Ninth Day of November, 2010

David J. Kappos
*Director of the United States Patent and Trademark Office*